(12) United States Patent
Nakane

(10) Patent No.: US 8,539,115 B2
(45) Date of Patent: Sep. 17, 2013

(54) SERVER DEVICE, SYSTEM, AND OPERATION ENVIRONMENT MANAGEMENT METHOD

(75) Inventor: Rintaro Nakane, Kanagawa (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/611,035

(22) Filed: Sep. 12, 2012

(65) Prior Publication Data
US 2013/0073750 A1 Mar. 21, 2013

Related U.S. Application Data

(60) Provisional application No. 61/536,216, filed on Sep. 19, 2011.

(51) Int. Cl.
*G06F 7/00* (2006.01)
(52) U.S. Cl.
USPC .................................... 710/8; 710/15

(58) Field of Classification Search
None
See application file for complete search history.

(56) References Cited

U.S. PATENT DOCUMENTS

| | | | | |
|---|---|---|---|---|
| 6,930,793 | B1 * | 8/2005 | Namizuka et al. | 358/1.16 |
| 8,244,923 | B2 * | 8/2012 | Hamaguchi | 710/8 |
| 8,271,703 | B2 * | 9/2012 | Wang et al. | 710/62 |
| 8,380,889 | B2 * | 2/2013 | Sretenovic | 710/15 |
| 2012/0110213 | A1 | 5/2012 | Abe | |

* cited by examiner

*Primary Examiner* — Cheng-Yuan Tseng
(74) *Attorney, Agent, or Firm* — Turocy & Watson, LLP

(57) ABSTRACT

Certain embodiments provide a server device including: a first storage section which stores task execution device information for each of the identification information items of a plurality of task execution devices; a second storage section which stores operation environment information for each identification information item of an operating device; a receiving section which receives a requested task from the operating device to the task execution device; and a providing section which examines whether or not the requested task is executable and provides an examination result and the operation environment information corresponding to identification information to the operating device.

20 Claims, 20 Drawing Sheets

FIG. 4A

| OPERATION SCREEN | SCREEN FOR OD1 | SCREEN FOR OD2 | . . . |
|---|---|---|---|
| TYPE | OLD | NEW | . . . |
| CONFIGURATION | △ | ○ | . . . |
| LAYOUT | △ | ○ | . . . |
| DESIGN | △ | ○ | . . . |
| METHOD | DEFAULT | ○ | . . . |

FIG. 4B

| USER NAME | USER A | USER B | . . . |
|---|---|---|---|
| ID | ○ | ○ | . . . |
| DEPARTMENT | BRANCH 1 | BRANCH 2 | . . . |
| CONTACT | 055-* | 03-* | . . . |

FIG. 4C

| OPERATING DEVICE | OD1 | OD2 | . . . | OD7 |
|---|---|---|---|---|
| SERIAL NUMBER | | | . . . | |
| DEVICE TYPE | PC | SIGNAGE TERMINAL | . . . | MOBILE PHONE |
| INSTALLATION POSITION | 1F | 1F | . . . | |

FIG. 7

| AUTHENTICATION INFORMATION | ID | | . . . |
| --- | --- | --- | --- |
| | PASSWORD | | |
| USER ATTRIBUTE | NAME | A | |
| | DEPARTMENT | | |
| | CONTACT | | |
| | . . . | | |
| OPERATING DEVICE | TYPE | | |
| | MODEL | | |
| | SERIAL NUMBER | | |
| | . . . | | |

FIG. 8A

| AUTHENTICATION INFORMATION | ID | |
| --- | --- | --- |
| | PASSWORD | |
| USER ATTRIBUTE | NAME | A |
| | DEPARTMENT | |
| | CONTACT | |
| | . . . | |

FIG. 8B

| DATE OF USE | YY.DD.HH:MM:SS | 11.3.16:10:10:18 | 11.3.17:11:36:48 | . . . |
| --- | --- | --- | --- | --- |
| OPERATING DEVICE | TYPE | PC | MOBILE TERMINAL | |
| | MODEL | XXXXX | XXXXX | |
| | SERIAL | XXXXX | XXXXX | |
| | . . . | | | |
| OPERATION ENVIRONMENT | TYPE | RICH UI | RICH UI | |
| | CONFIGURATION | ADDRESS... | ADDRESS... | |
| | LAYOUT | ADDRESS... | ADDRESS... | |
| | DESIGN | ADDRESS... | ADDRESS... | |
| | DEFAULT METHOD | ADDRESS... | ADDRESS... | |
| | . . . | | | |
| TASK EXECUTION DEVICE | TYPE | MFP | MFP | |
| | SERIAL NUMBER | XXXXX | XXXXX | |
| | LOCATION | BRANCH A | BRANCH B | |
| | ADMINISTRATOR | . . . | . . . | |
| | . . . | | | |
| USED FUNCTION | TASK TYPE | PRINTING | PRINTING | |
| | RESTRICTION | NONE | MONOCHROME | |
| | . . . | | | |
| | DOUBLE-SIDED PRINTING | DOUBLE-SIDED PRINTING | DOUBLE-SIDED PRINTING | |
| | STAPLING | STAPLING | STAPLING | |
| | SHEET | A4 | A4 | |
| | . . . | | | |

FIG. 9A

| AUTHENTICATION INFORMATION | ID | |
| --- | --- | --- |
| | PASSWORD | |
| USER ATTRIBUTE | NAME | B |
| | DEPARTMENT | |
| | CONTACT | |
| | . . . | |

FIG. 9B

| DATE OF USE | YY.DD.HH:MM:SS | 11.3.16:10:10:18 | . . . |
| --- | --- | --- | --- |
| OPERATING DEVICE | TYPE | PC | |
| | MODEL | XXXXX | |
| | SERIAL | XXXXX | |
| | . . . | | |
| OPERATION ENVIRONMENT | TYPE | OLD TYPE | |
| | CONFIGURATION | ADDRESS... | |
| | LAYOUT | ADDRESS... | |
| | DESIGN | ADDRESS... | |
| | DEFAULT METHOD | ADDRESS... | |
| | . . . | | |
| TASK EXECUTION DEVICE | TYPE | | |
| | SERIAL NUMBER | | |
| | LOCATION | | |
| | ADMINISTRATOR | | |
| | . . . | | |
| USED FUNCTION | TASK TYPE | | |
| | RESTRICTION | | |
| | DOUBLE-SIDED PRINTING | | |
| | STAPLING | | |
| | SHEET | | |
| | . . . | | |

FIG. 10

| TASK EXECUTION DEVICE | IPD1 | IPD2 | IPD3 | IPD4 | ... |
|---|---|---|---|---|---|
| | MODEL A | MODEL B | MODEL C | MODEL A | |
| SERIAL NUMBER | | | | | |
| LOCATION | BRANCH A A ZONE IN FIRST FLOOR | BRANCH B B ZONE IN SECOND FLOOR | BRANCH B C ZONE IN THIRD FLOOR | BRANCH B D ZONE IN FOURTH FLOOR | |
| ADMINISTRATOR | ... | | | | |
| ... | | | | | |
| COLOR | COLOR | COLOR | MONOCHROME | COLOR | |
| RESTRICTION | — | — | — | PROHIBITING COLOR PRINTING | |
| DOUBLE-SIDED PRINTING | AVAILABLE | NOT AVAILABLE | AVAILABLE | AVAILABLE | |
| STAPLING | AVAILABLE | NOT AVAILABLE | NOT AVAILABLE | AVAILABLE | |
| ... | | | | | |
| SHEET | A4 | A4 | A4 | A4 | |
| | A3 | A3 | NOT AVAILABLE | EMPTY | |
| | | ... | | | |
| ... | | | | | |
| POWER | ON | ON | ON | ON | |
| USE STATE | NORMAL | NORMAL | NORMAL | NORMAL | |
| RESERVATION STATE | NO | YES | NO | NO | |
| CONSUMABLE | NORMAL | NORMAL | NORMAL | NORMAL | |
| LAN CONNECTION | CONNECTED | CONNECTED | CONNECTED | CONNECTED | |
| ... | | | | | |

15

SERVER DEVICE, SYSTEM, AND OPERATION ENVIRONMENT MANAGEMENT METHOD

CROSS-REFERENCE TO RELATED APPLICATION

The present application claims priority under 35 U.S.C. 119 to U.S. Provisional Application Ser. No. 61/536,216, to Nakane, filed on Sep. 19, 2011, the entire disclosure of which is incorporated herein by reference.

FIELD

Embodiments described herein relate to a server device, a system, and an operation environment management method.

BACKGROUND

Users are able to operate an image forming device in a direct manner and in a remote manner from a distant location via a network or a wireless connection.

The users use operating devices. As such operating devices, a personal computer connected to a LAN (local area network), for example, a computer placed at a distant location via a wide area connection, a wireless mobile phone, a wireless mobile terminal, and the like are used.

Indeed, individual operating devices have different operation screens and operation methods depending on the type. Each user desires to use an operating device with a familiar operation screen or an operation method or in operation setting customized for usability.

Such an operating device used in familiar or customized operation settings is limited only to a specific operating device.

The user causes a device such as an image forming device, which executes a task, to execute a desired task. The task means a set of jobs for achieving one purpose or an interaction between a person and a task execution device.

The user causes the image forming device to execute a task at a distant location or when the user is away. For example, a user working at a first office travels on business to a second office. The user selects one of a plurality of image forming devices in the second office. The user sends a task for printing a material for presentation to the image forming device.

However, individual image forming devices have different operation screens and operation methods. For the user, a certain task execution device has a familiar operation screen and a familiar operation method or operation setting customized for usability.

Such a task execution device by which the user can use familiar or customized operation settings is limited only to a specific image forming device. The user uses only the specific image forming device in the customized operation setting.

BRIEF DESCRIPTION OF THE DRAWINGS

FIG. 4A is a table showing operation environment information used in a system according to an embodiment;

FIG. 4B is a table showing user information used in a system according to an embodiment;

FIG. 4C is a table showing operating device information used in a system according to an embodiment;

FIG. 7 is a chart showing an example of management content managed by a system according to an embodiment;

FIG. 8A is a chart showing a first example of a history of a first user managed by a system according to an embodiment;

FIG. 8B is a chart showing a second example of a history of the first user managed by a system according to an embodiment;

FIG. 9A is a chart showing an example of a history of the second user managed by a system according to an embodiment;

FIG. 9B is a chart showing a second example of a history of the second user managed by a system according to an embodiment;

FIG. 10 is a chart showing task execution device information used in a system according to an embodiment;

DETAILED DESCRIPTION

In general, certain embodiments, provide a server device including: a first storage section configured to store task execution device information on correspondence between a task and restriction information for the task for each of identification information items of a plurality of task execution devices, each of the plurality of task execution devices respectively executing tasks including a series of operation elements; a second storage section configured to store operation environment information including screen display attributes for each identification information item of an operating device, the operating device including a screen and a menu on the screen, selecting one of the plurality of task execution devices by operating the menu, and requesting the task execution device to execute the task; a receiving section configured to receive identification information on the operating device, identification information on the task execution device, and a requested task to the task execution device from the operating device registered in the second storage section; and a providing section configured to examine whether or not the requested task is executable based on the requested task sent to the receiving section and the restriction information of the task execution device information corresponding to the identification information of the task execution device and provide an examination result and the operation environment information corresponding to the identification information of the operating device to the operating device.

Hereinafter, detailed description will be given of the server device, the system, and the operation environment management method with reference to the accompanying drawings as examples.

First Embodiment

Figure 1:
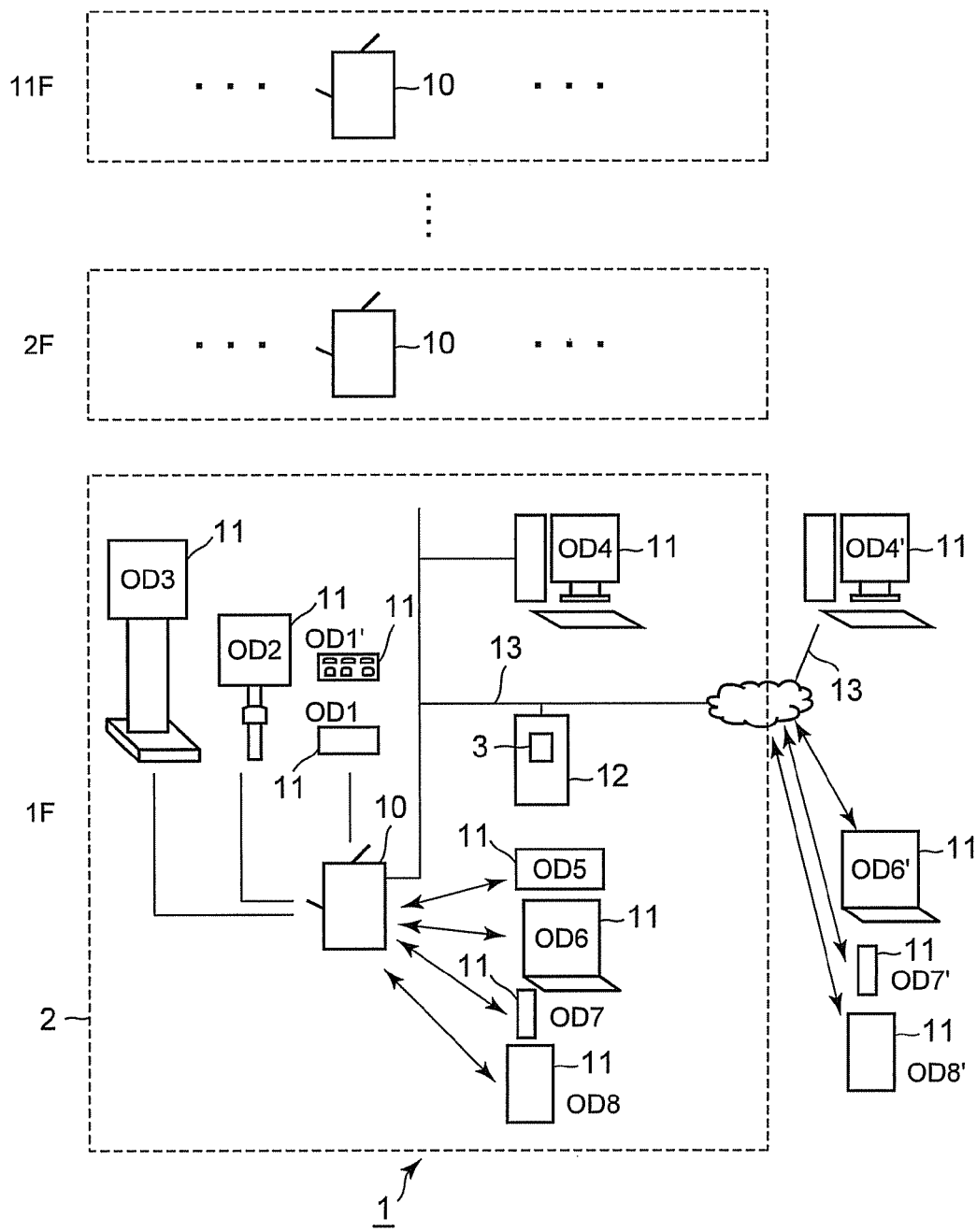
FIG. 1 is a configuration diagram of a system according to an embodiment.

FIG. 1 is a configuration diagram of a system according to an embodiment.

A system 1 includes a plurality of MFPs (multi-function peripherals) 10 (task execution device) which are provided in a building 2 to respectively execute tasks and a plurality of operating devices 11 (shown as ODs) which respectively select one of the MFPs 10 and request the MFP 10 to execute a task.

Furthermore, the system 1 is provided with a sever 12 (server device) which includes an operation environment management section 3 and transmits and receives information between the MFPs 10 and the operating devices 11 and a network 13.

Figure 2:
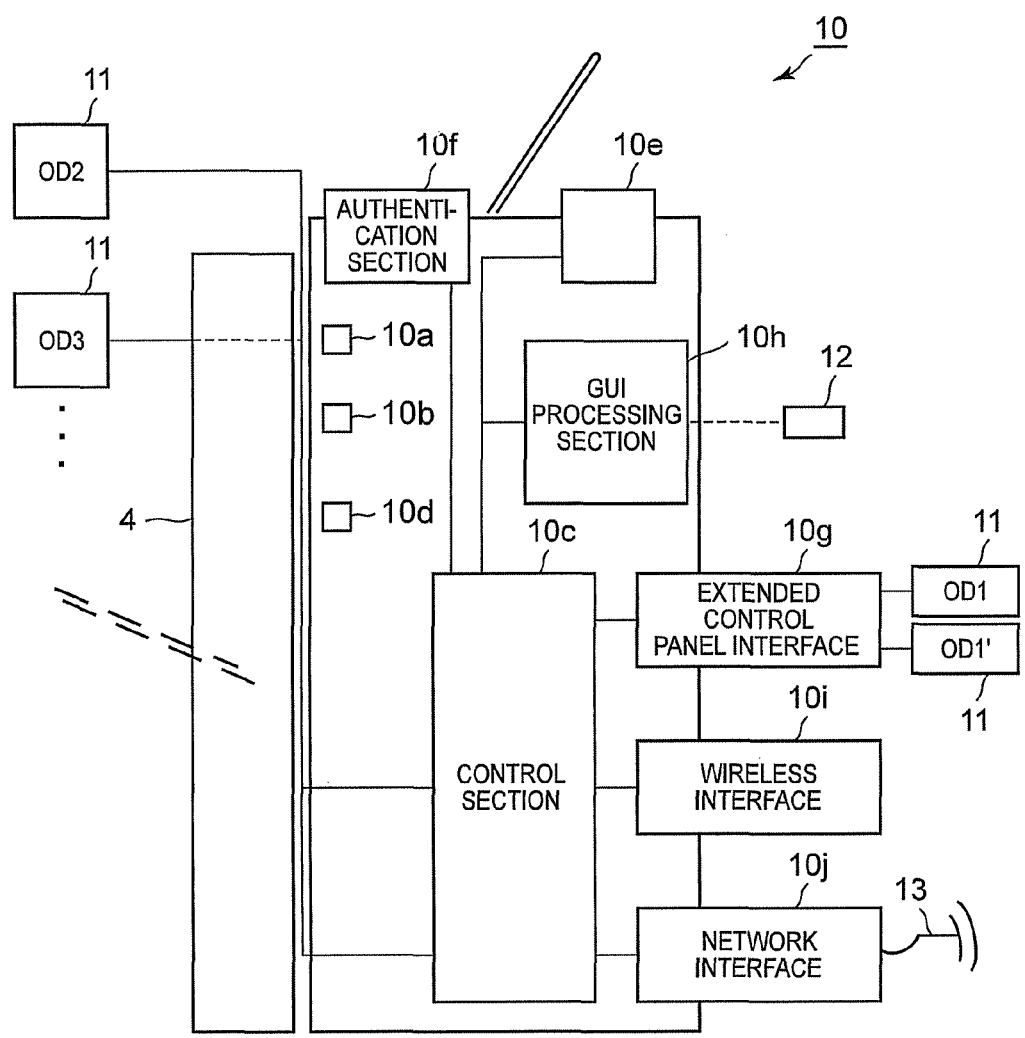
FIG. 2 is a configuration diagram of a task execution device in a system according to an embodiment.

FIG. 2 is a configuration diagram of the MFP 10. The reference numerals described above represent the same elements. The MFP 10 is a task execution device including a controllable user interface.

A task executed by the MFP 10 is configured by a series of operation elements. A task means a set of jobs for achieving one purpose or an interaction between a person and the MFP 10.

An operation element means a piece of work, an operation, an action, a motion, setting, or the like. A series of operation elements includes a person setting a sheet in the MFP 10, inputting a setting to a control panel 10e, pressing an execution button, and receiving a sheet with an output image thereon, or the like.

The MFP 10 includes a scanner 10a, a printing section 10b, a control section 10c, and a hard disk drive 10d.

The scanner 10a generates image data from a surface of an original document. The printing section 10b performs printing on a sheet. The control section 10c controls copying, scanning, printing, and signage.

The hard disk drive 10d saves image data in various forms. The hard disk drive 10d accumulates information representing that the power of the MFP 10 is turned on or off, a current device state of the MFP 10, remaining amounts of consumables, and the like.

The device state means a current use state of the device, a reservation state of a task such as a printing task. In addition, the device state includes information on the presence of abnormalities in the device, whether or not the device is currently under maintenance, whether a door is being opened, and the like.

The MFP 10 may be connected to a finisher 4. The control section 10c may cause the finisher 4 to perform stapling, punching, and binding on a sheet.

The MFP 10 includes the control panel be which receives an operation input from the user and an authentication section 10f which authenticates a person who operates the MFP 10. The MFP 10 may include an extended control interface 10g.

Furthermore, the MFP 10 includes a GUI (graphical user interface) section 10h. The GUI section 10h displays on the control panel be a language set for an individual in response to a command from the server 12, an operation screen, a button, an operation procedure, and the like.

The MPF 10 includes a wireless interface 10i for a wireless signage terminal or the like and a network interface 10j for connection to a network 13.

In FIG. 1, each of the plurality of operating devices 11 includes a screen and a menu on the screen, and the MFP 10 is requested to execute a task by an operation on each menu.

Hereinafter, description will be given while the plurality of operating devices 11 are discriminated from each other with device names of OD1 to OD8, OD1', OD4', OD6', OD7', and OD8'.

The OD1 includes an operation panel which is a small-sized touch panel directly connected to the MFP 10. The OD1 can be detached from the MFP 10.

The OD2 includes an operation panel which is a medium-sized touch panel with an arm. The OD3 includes an operation panel which is a large-sized touch panel display.

The OD2 and OD3 are coupled to the MFP 10 by an extended control interface 10g to display signage advertisements.

The OD4 is a client personal computer connected to the network 13. The OD5 is an operation panel which is a small-sized touch panel with wireless transmitting and receiving functions. The OD6 is a mobile personal computer with wireless transmitting and receiving functions.

The OD7 is a mobile phone. The OD8 is a mobile terminal with wireless transmitting and receiving functions.

The OD1' is an operation panel with physical operation keys. The OD4' is a client personal computer.

The OD6' is a mobile personal computer with wireless transmitting and receiving functions. The OD7' is a mobile phone. The OD8' is a mobile terminal with wireless transmitting and receiving functions.

The OD4', OD6', OD7', and OD8' remotely operate the MFP 10 via the network 13.

The OD1 as the operating device 11 sends a task execution request to the server 12. After the transmission, the OD1 receives from the server 12 information on whether or not the task can be executed. The OD1 reflects a result representing validity or invalidity to the task execution request.

The OD1 displays on a screen a requirement of reselecting another MFP 10 or a requirement of changing the requested task content in response to the reply from the server 12. The OD1 repeatedly transmits and receives information to and from the server 12 and reflects a use history to the screen.

The same as that in the case of the OD1 is true even in the operating devices 11 represented as OD2 to OD8, OD1', OD4', OD6', OD7', and OD8'.

In addition, the network 13 is configured by the Internet, a transmission cloud network, a wide area connection, or a LAN in the building 2.

Figure 3:
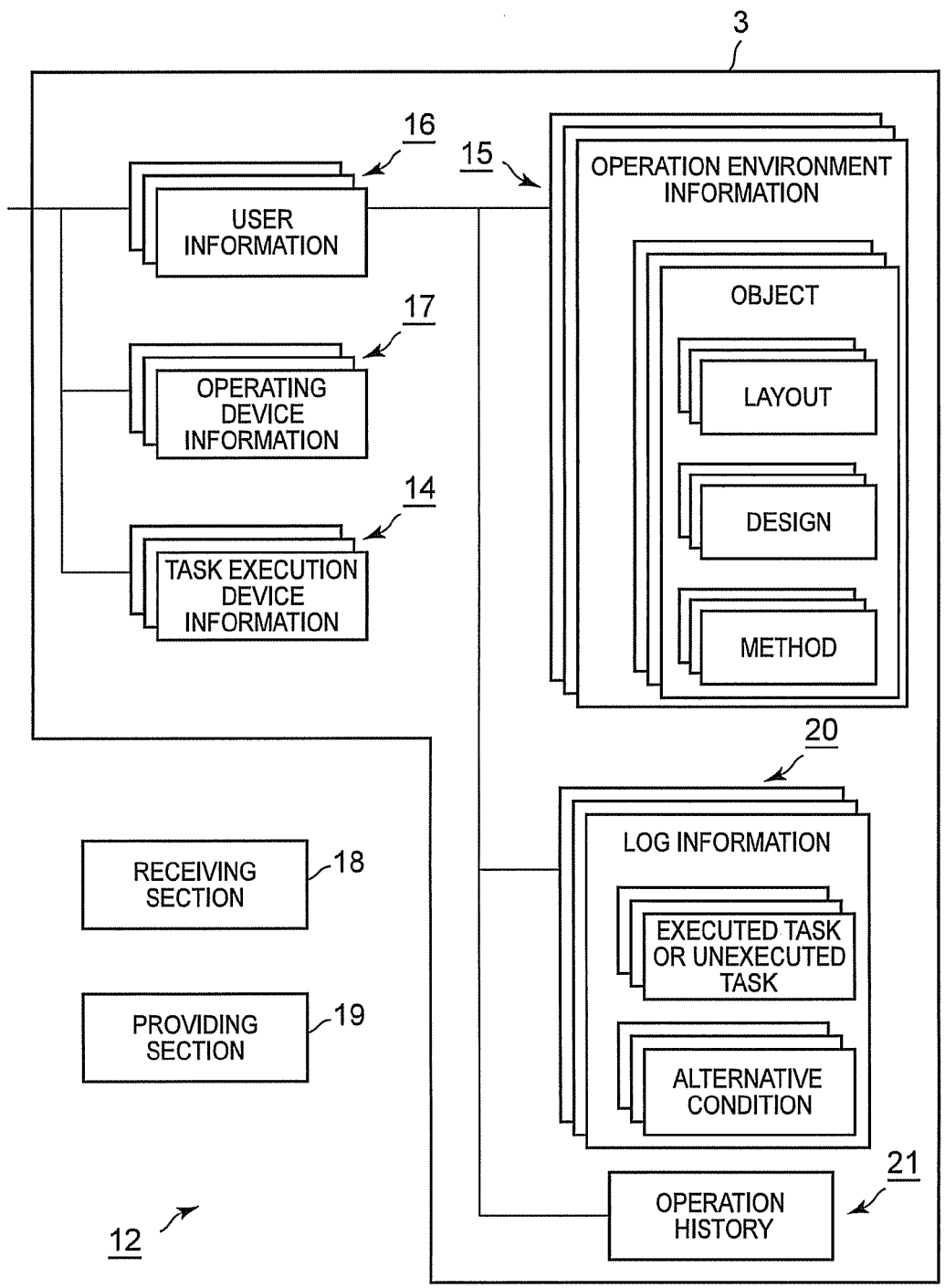
FIG. 3 is a diagram showing main components of a server device according to an embodiment.

FIG. 3 is a diagram showing main components of the server 12. The reference numerals described above represent the same elements. The server 12 is a server computer.

The server 12 includes the operation environment management section 3. The operation environment management section 3 manages and provides operation environments of various operating devices 11 for the user.

The operation environments mean operation screens. An operation screen is set depending on user preference under a condition of using an operating device 11. The operation environment includes an operation method representing a specific procedure. The operation environment information means information on a customized operation screen.

The server 12 includes a first storage section 14 which stores task execution device information for each of the serial numbers (identification information) of the plurality of MFPs 10 and a second storage section 15 which stores operation environment information for each of the serial numbers (identification information) of the operating devices 11.

The task execution device information means information on correspondence between task content and task content restriction information.

FIG. 10 shows task execution device information. The reference numerals described above represent the same elements.

The drawing shows device attribute information for each of the device names (IPD 1 and the like) of the MFPs 10 (task execution devices). A device name is unique and corresponds to a serial number.

For example, a print task and a restriction of the print task that color printing is not possible are associated in task execution device information.

The device attribute includes an installation position of the MFP 10 and a device type of the MFP 10 for each device name (or an MFP 10 serial number) of the MFP 10.

The first storage section 14 stores device attributes including an installation position and a device type for each identification information item of the MFP 10.

The first storage section 14 also stores a device state including remaining amounts of consumables of the MFP 10, a current use state of the MFP 10, and a reservation state of the MFP 10 for each of the plurality of MFPs 10.

In addition, the operation environment information in the second storage section 15 is represented as display attribute and a method in FIG. 3.

The display attribute means a type of a screen, a plurality of objects configuring the screen, a layout and a design of the objects. The method means a procedure based on a program, which is to be executed if a message is sent to a certain object.

FIG. 4A is a table showing operation environment information. The reference numerals described above represent the same elements.

The second storage section 15 stores a plurality of operation environment information items for each operating device 11 or each user. In relation to the operation environment information in the drawing, the display attribute is stored for each operation screen of the operating device 11. The operation environment information is customized for each device name or each serial number (identification information) of the operating device 11.

Alternatively, the second storage section 15 stores the operation environment information for each user. In relation to the operation environment information in this case, the display attribute is stored for each user. That is, the plurality of operation environment information items are customized for each of a plurality of user IDs (identifications) (identification information).

Alternatively, the second storage section 15 stores as the operation environment information the display attribute of operation screens of a plurality of operating device 11 for each user.

For example, the second storage section 15 stores two kinds of operation environment information items for a user A. A setting in which the user A prints a material to be given to a client and a setting in which the user A prints a material to be used in a company meeting are stored.

In the drawing, the type means the attribute display representing whether the operation screen is an old type or supports a touch gesture (new type) function. The touch gesture means a movement of a finger on the screen while the finger is in contact with the screen.

The objects configuring the screen means a button, numeric keys, a main menu, a detailed menu, and the like. The objects are entities which receive a program for generating an operation screen or a message by the program.

In relation to the layout of the objects, an arrangement of a main menu on the upper side in the screen and a detailed menu below the main menu, for example, is designated. For the layout, the positions of buttons and the like are designated.

The design is a screen pattern display attribute and represents a monotone pattern, a metallic pattern, or a wood-effect pattern.

The method means a default method described in advance to execute ordinary functions. For example, a procedure for igniting a program or hardware to move when a button on the screen is pressed is described.

The server 12 includes a third storage section 16 which stores user information.

FIG. 4B is a table showing user information. The reference numerals described above represent the same elements. The user information is information with which user attribute is associated for each of a plurality of users A, B, and C.

The server 12 includes a fourth storage section 17 which stores operating device information.

FIG. 4C is a table showing operating device information. The reference numerals described above represent same elements.

Operating device information associated with an attribute such as a terminal type is stored for each of the plurality of operating devices 11 with the device names such as OD1 and OD2.

In addition, the server 12 in FIG. 3 includes a receiving section 18 which receives data from the plurality of operating devices 11 and the MFPs 10 and a providing section 19 which transmits data to the plurality of operating devices 11 and the MFPs 10 to provide information.

The receiving section 18 receives from the plurality of registered operating devices 11, serial numbers (identification information) of the operating devices 11, serial numbers or devices names (identification information) of the MFPs 10, and requests tasks to be executed by the MFPs 10.

The receiving section 18 receives position information from the operating devices 11. The position information means latitudes and longitudes obtained by a GPS (global positioning system). Alternatively, the position information means IP (internet protocol) addresses of the operating devices 11 or installation positions of the operating devices 11, which are input to the operating devices 11 by persons.

The receiving section 18 collects from the plurality of MFPs 10 device state information and information representing whether the powers are on or off. The server 12 generates a table (FIG. 10). The server 12 updates operation environment information.

In addition, the providing section 19 examines whether or not a requested task can be executed based on the requested task received by the receiving section 18 and restriction information of the task execution information in the first storage section 15 corresponding to a serial number or the like of the MFP 10.

The providing section 19 reads the examination result and the operation environment information in the second storage section 15 corresponding to the serial number of the operating device 11 and provides the operation environment information to the operating device 11.

The providing section 19 obtains a restriction condition which is imposed on the MFP 10 based on the restriction information depending on the examination result. The providing section 19 reflects the restriction condition to the operation environment information and provides the operation environment information after the reflection of the restriction condition to the operating device 11.

If the examination result represents that the requested task cannot be executed based on the restriction information, the providing section 19 sends a notification for encouraging the operating device 11 as a transmission source to reselect another MFP 10 or change the requested task.

The providing section 19 selects one or more candidates among the MFPs 10 in the first storage section 14 depending on the device attribute, the position information of the operating device 11, and the requested content of the requested task. For example, there are a plurality of MFPs 10 in each floor of the building 2. Each office has a plurality of MFPs 10.

The MFPs 10 which meet the requested task content or execute a task which is close to the task request are the candidates among the MFPs 10 in all offices.

The providing section 19 suggests the candidates to the operating device 11. The providing section 19 sends a serial number or a device name of the searched MFP 10 to the operating device 11.

Furthermore, the server 12 includes a log information storage section 20 which stores log information. The log information is log of correspondence between user attributes and a use history of each MFP 10 for each user ID.

The providing section 19 obtains the use history in the log information corresponding to the user ID obtained by the receiving section 18 and reflects the use history to the operation environment information. The providing section 19 transmits the operation environment information after the reflection to each operating device 11.

In addition, the server 12 includes an operation history storage section 21 which saves a history (first history) of the reflected operation environment information.

If the operation history storage section 21 stores another history (second history) from the above history, the providing section 19 presents operation environment information, which is the same as or similar to the operation environment information after the reflection saved in the operation history storage section 21, as a candidate to the operating device 11.

Functions of each storage section (the first storage section 14, the second storage section 15, the third storage section 16, the fourth storage section 17, and the log information storage section 20) are executed by the hard disk drive.

An expansion hard disk drive or a flash memory may be used as each of the storage sections. A recording medium such as an optical disc or a magnetic disk may be used for each of the storage sections.

The functions of the operation environment management section 3 are executed by a CPU (central processing unit), a ROM (read only memory), and a RAM (random access memory).

The functions of the receiving section 18 and the providing section 19 are executed by an LSI (large scale integration), a communication controller, or the like connected to the CPU via a bus.

In addition, an operation environment management method according to the embodiment is an information management method by the server 12.

The methods prepare task execution device information and operation environment information.

The method receives a serial number of an operating device 11, serial numbers or device names of MFPs 10, and a requirement of executing a task including a requested task to the MFP 10 from the operating device 11. In response to the requirement, the method examines restriction information corresponding to the serial numbers of the MFPs 10 and information on whether or not the requested task can be executed.

The method provides the examination result and the operation environment information corresponding to the serial numbers of the MFPs 10 to the operating device 11.

The method obtains a restriction condition imposed on the MFP 10 based on the restriction information in accordance with the examination result and reflects the operation environment information in reflecting the examination result. The method provides the operation environment information after the reflection to the operating device 11.

In addition, the method obtains position information of the operating device 11 in reflecting the examination information. The method includes in display content one or more candidates among the plurality of MFPs 10 based on a search by the position information and the device installation position information included in the task execution device information.

Furthermore, the method accumulates user operation histories via the operating device 11 or the MFP 10 and reflects the operation histories to the operation environment information.

The system 1 with the above configuration allows the user to select a plurality of operating devices 11 and a plurality of MFPs 10 (task execution devices).

The system 1 provides an operation environment (a screen, an operation method) of user preference to an operating device 11 being used by the user even if the user uses any operating device 11 and selects any MFP 10.

In other words, the system 1 makes it possible (a) to request one MFP 10 to execute a task from a plurality of operating devices 11 and (b) to request a plurality of MFPs 10 to execute a task from an operating device 11 by one user.

The former (a), is about access if a ratio between the number of the MFPs 10 and the number of the user interfaces is one-to-many.

For example, each of the operating devices 11 with the device names OD1 to OD8 requests a certain MFP 10 in the building 2 to execute tasks. Alternatively, each of the operating devices 11 with the device names OD1', OD4', OD6' to OD8' outside the building 2 requests the MFP 10 to execute tasks.

The latter (b) is about access if one user interface accesses a plurality of MFPs 10. The user usually uses their own operating device 11 (UI device) to cause an MFP 10 in a first office to perform printing.

The user travels on business to a second office. The user uses the same operating device 11 to cause an MFP 10 at the second office to perform printing.

The system 1 manages the operation screens for both (a) and (b).

Figure 5:
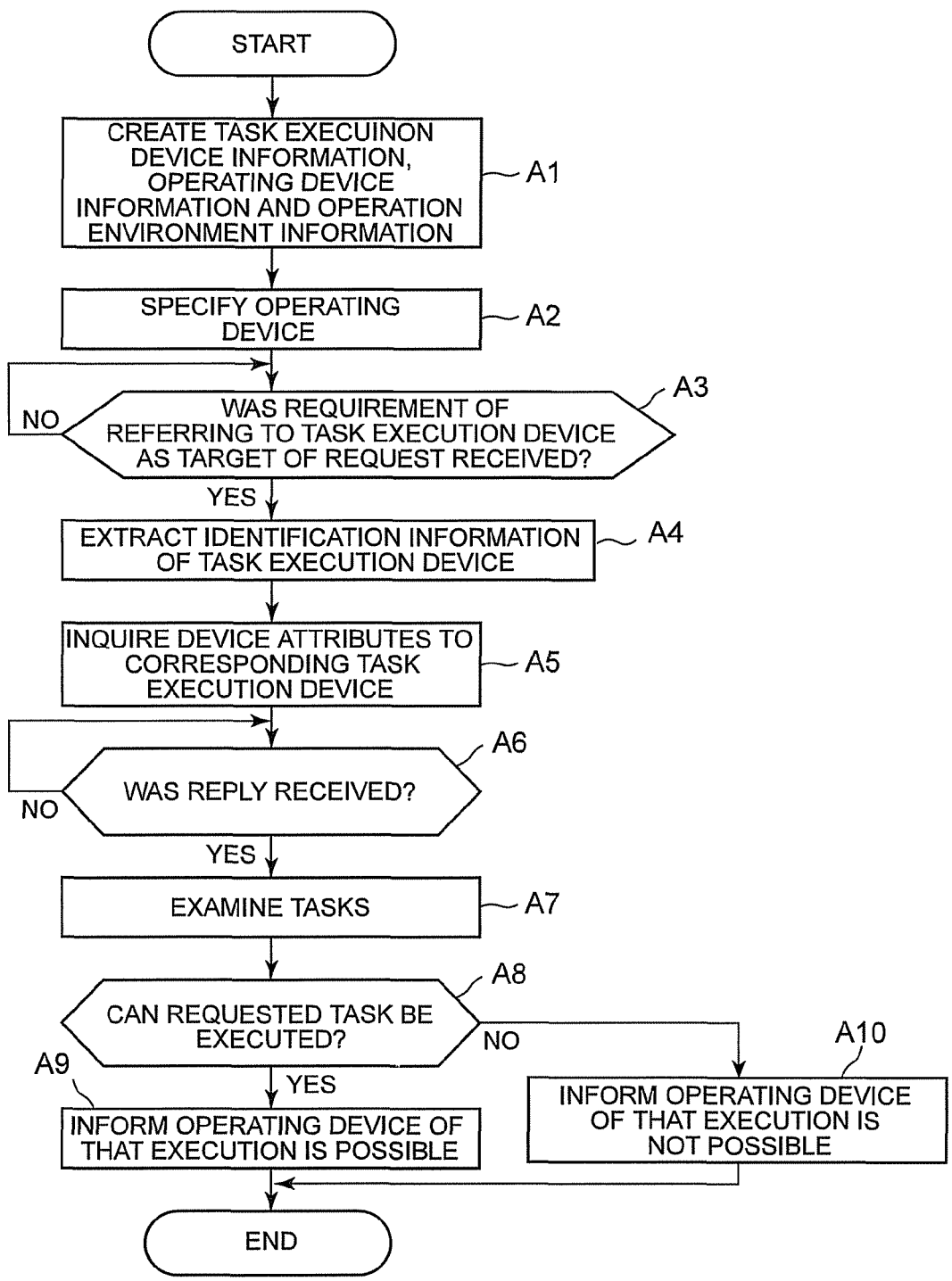
FIG. 5 is a flowchart illustrating a management method for an operation environment used in a system according to an embodiment.

FIG. 5 is a flowchart illustrating a management method of the server 12 by the system 1.

In Act A1, the system 1 creates task execution device information, operating device information, and operation environment information in advance as shown in FIG. 3.

Figure 6:
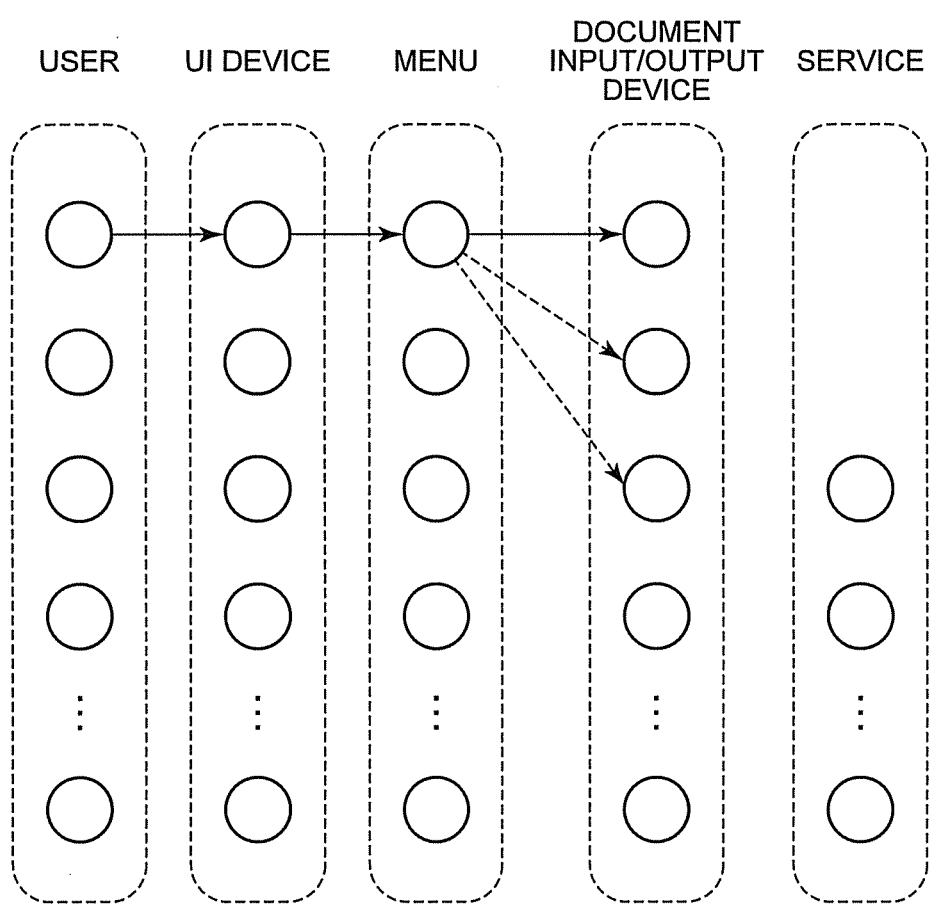
FIG. 6 is a conceptual diagram showing task paths used in a system according to an embodiment.

FIG. 6 is a conceptual diagram showing task paths from a user to a document input and output device. Circles represent nodes belonging to the categories.

Information on the document input and output device corresponds to the task execution device information. Information on the UI (user interface) device corresponds to the operating device information. The customizing information corresponds to the operation environment information.

The categories (see broken lines) correspond to users, operating devices 11 (UI devices), menus (operation environments), task execution devices (document input and output devices), and related service providers (services).

Each user selects a UI device to be used. The user uses a menu screen customized for the user. The UI device selects a document input and output device from the menu screen in accordance with a situation. The UI device causes the document input and output device to execute a task with paths expressed with arrows.

By the processing in Act A1, information on the document input and output device, information on the UI device, and customizing information about a plurality of menu screens for one user are associated with each other. A plurality of options become available for the user.

If a plurality of options becomes available for the system 1, the system 1 manages various kinds of information as shown in FIGS. 7 to 10.

FIG. 7 is a chart showing management content about users and UI devices managed by the operation environment management section 3.

The drawing shows user authentication information, user attributes in personal information, and attribute information of the operating device 11 used in logging in the system 1.

The user selects a menu from a certain UI device and selects a certain document input and output device. In the selection, the system 1 requests the operator of the UI device to input a log-in ID and a password.

The system 1 registers user attributes in the operation environment management section 3 in response to the log-in. Thereafter, the system 1 specifies the user who logged in the system 1 based on the user attributes.

A plurality of categories required for one task are different (FIG. 6). For example, tasks are different depending on users. Tasks are also different depending on UI devices selected in logging in the system 1, menus, or document input output devices.

In addition, the system 1 manages an operation history.

FIGS. 8A and 8B are a plurality of charts showing an example of an operation history of a specific user (a user A in this example) using a certain operating device 11.

The system 1 associates the user A with a user with user attributes shown in FIG. 8A and records a history shown in FIG. 8B in the operation history storage section 21. The system 1 updates the history every time the task execution is completed.

One history includes the following: details about an operating device 11 operated by the user A, an operation environment (a type, a screen configuration, a layout of objects in the screen, design, a method), a task execution device, and used functions.

The used functions means requested task content and attribute of the task content. The restriction of "monochrome" means that color printing is not available. The restriction includes a restriction item that a power saving mode is used.

The operation history storage section 21 stores who selected attributes such as double-sided printing, stapling, and sheet sizes with which device in what environment during what task was executed.

In the related art, an operation screen used as a user interface or an operation method is different for each operating device or each task execution device.

If the operation screen is different, the user needs to memorize an operation screen for each operating device or each task execution device. Alternatively, the user needs to learn an operation method for each operating device or each task execution device through repeated trial and error.

On the other hand, an operation environment of an operating device 11 for each user can be obtained without depending on a task execution device to the maximum extent in the system 1. The system 1 takes user preference into account. Each user can obtain an operation environment in which the user can easily perform operations.

A task which the user desires to execute cannot be performed due to restriction of the task execution device in some cases. The system 1 may inform the user of the fact that the task cannot be executed. If the system 1 cannot execute the task, the system 1 encourages the user to select an alternate method (changing task content or changing a device).

In addition, the system 1 manages a fact that the same UI device was used by a plurality of users. Description will be given of an example in which a user B uses the same operating device 11 as the operating device 11 used by the user A in the example shown in FIGS. 8A and 8B.

FIGS. 9A and 9B are a plurality of charts showing an example of a history of operations another user (user B) performs. Even if the user A and the user B use the same operating device 11, the system 1 provides different operation environments to each of the user A and the user B.

The user A selects a rich UI (new type) in the example in FIG. 8B, and FIG. 9B shows an example in which the user B selects an old type as an operation environment.

The rich UI means a screen type with a user interface allowing a user to perform operations by touch gesture and animation. The old type means a screen type with a GUI using many buttons with words relating to menus thereon.

Two or more users use a same operating device 11 in some cases. Each user has different preference and a different level of proficiency. Each user desires to select an operation environment in accordance with their preference and the level of proficiency. The system 1 can provide an operation screen customized in response to a request from each user.

In addition, the system 1 manages device attributes in a plurality of task execution device information items as shown in FIG. 10.

Each task execution device has different attributes. An installation position, an administrator, and functions (color printing, double-sided printing, stapling, administrator restriction, and the like) are different. Consumables (a sheet, a toner, and the like) are different.

Furthermore, the device attributes include the following: power on or power off, presence of abnormalities in hardware, presence of reservation, whether or not remaining amounts of the consumables are sufficient, presence of a LAN connection, and the like. The reservations mean reservations for printing and for a task for the finisher 4.

The server 12 collects the device attribute by communicating with each MFP 10. The frequency at which the receiving section 18 collects the device attribute is periodic or in real time.

Particularly, a user sends a task reservation to an MFP 10 from a distant location from the MFP 10 in some cases. Some task functions cannot be executed due to the device attributes of the counterpart task execution device. The system 1 can inform the user of whether or not the task can be executed in accordance with a condition of the device attributes.

Referring back to FIG. 5, in Act A2, the system 1 specifies a type and a position of the operating device 11. The server 12 receives the information on a current position from a certain operating device 11.

Figure 11A:
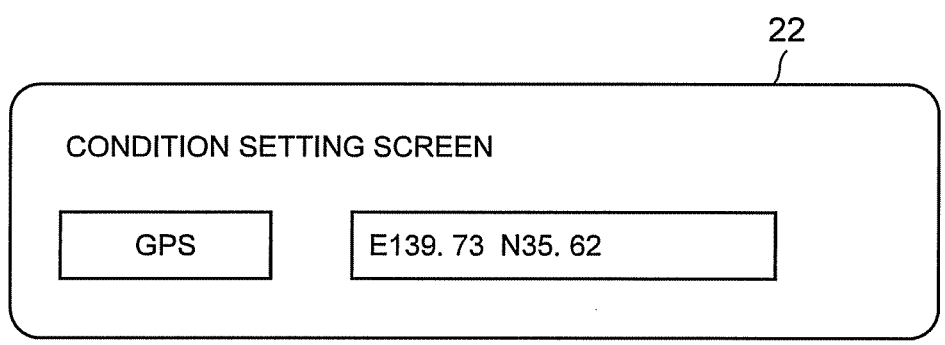
FIG. 11A is a diagram showing a first example of a condition setting screen of an operating device in a system according to an embodiment.
Figure 11B:
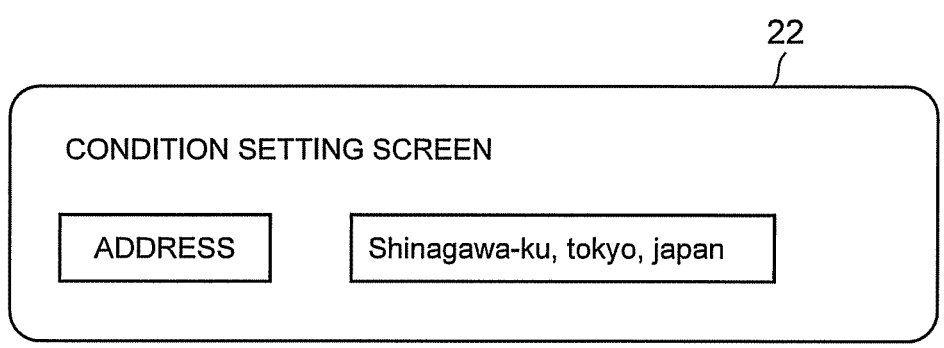
FIG. 11B is a diagram showing a second example of a condition setting screen of an operating device in a system according to an embodiment.
Figure 11C:
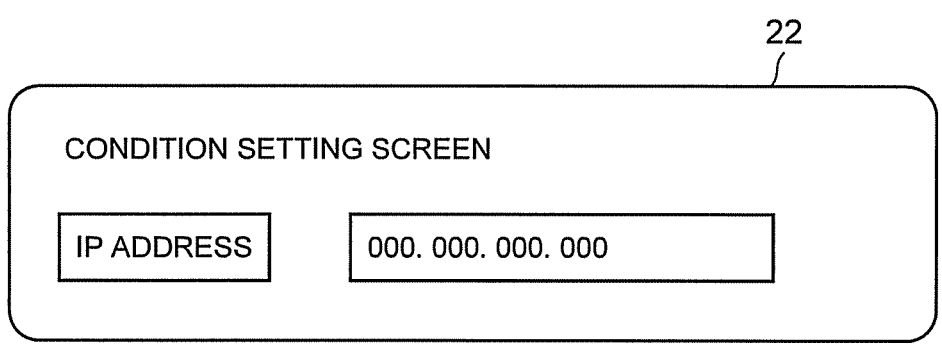
FIG. 11C is a diagram showing a third example of a condition setting screen of an operating device in a system according to an embodiment.

FIGS. 11A to 11C are a plurality of diagrams showing examples of condition setting screens. The reference numerals described above represent the same elements. The operating device 11 displays a condition setting menu on the operation screen 22 based on communication with the user.

If the operating device 11 is a mobile terminal or a mobile phone and includes a GPS receiver, the operating device 11 displays a latitude and a longitude automatically obtained by the GPS receiver on the operation screen 22 as shown in FIG. 11A.

If the operating device 11 is a personal computer or a touch panel, the operating device 11 reads a direct input from the user as shown in FIG. 11B. The operating device 11 displays text data representing an address on the operation screen 22.

The operating device 11 may hold a correspondence relationship between address data and office names in advance. The operating device 11 may display on the operation screen 22 a pull-down menu of a plurality of office names and receive selection by the user.

Alternatively, such a relationship may be applied to prefectures in Japan or states in the United States.

Alternatively, the operating device 11 is one of a mobile terminal, a mobile phone, a personal computer, and a touch panel. In such a case, the operating device 11 displays on the operation screen 22 an IP address input in the communication or shown in the pull-down menu as shown in FIG. 11C.

Alternatively, if the operating device 11 uses wireless connection, the operating device 11 may allow the user to select one of a plurality of access points.

In the operation of manually inputting an address, selecting an address, or inputting an IP address, the operating device 11 may display default addresses or the like. The default means a plurality of offices to which the user visits. The user registers in advance the default in a "my menu", for example.

In Act A2 in FIG. 5, the operating device 11 may transmits two kinds of information, namely information on a position of a first office and information on a position of a second office to the server 12. In such a case, the server 12 searches for task execution device information in the operation environment management section 3.

For example, the server 12 extracts one or more MFPs 10 based on the position information. For example, the server 12 searches for the MFPs 10 which are present in a predetermined distance from the position represented by the position information.

The server 12 may search for operation environment information based on serial numbers of the operating device 11 and the MFP 10. The server 12 sends information on the searched information on the customized operation screen to the operating device 11.

Subsequently, in Act A3, the server 12 waits for receiving a requirement of examining a target of a task execution request from a certain operating device 11 (NO route).

The procedure proceeds to a YES route if the server receives the requirement of examination from the operating device 11 in Act A3, and the server 12 extracts an identification number of a task execution device as a target of the request included in the requirement of examination in Act A4. A serial number or a device name is extracted.

In Act A5, the server 12 sends an inquiry about device attributes to the extracted task execution device as the target of the request. In Act A6, the server 12 waits for the reception of a reply from the task execution device.

If the server 12 waits for the reception in Act A6 (NO route), and the server 12 then receives the reply from the task execution device, the procedure proceeds to a YES route, and the server 12 examines the requested task and executable tasks in Act A7.

If requests of a plurality of tasks are made to the server 12 in the examination in Act A7, the server 12 may perform the examination for each task.

If an examination result is positive in Act A8, the procedure proceeds to a YES route, and the server 12 informs the operating device 11 of the requested task content, the identification number of the task execution device, and the result representing that the task can be executed in Act A9.

If an examination result is negative in Act A8, the procedure proceeds to a NO route, and the server 12 informs the operating device 11 of the requested content, the identification number of the task execution device, and the result representing that the task cannot be executed in Act A10.

Figure 12:
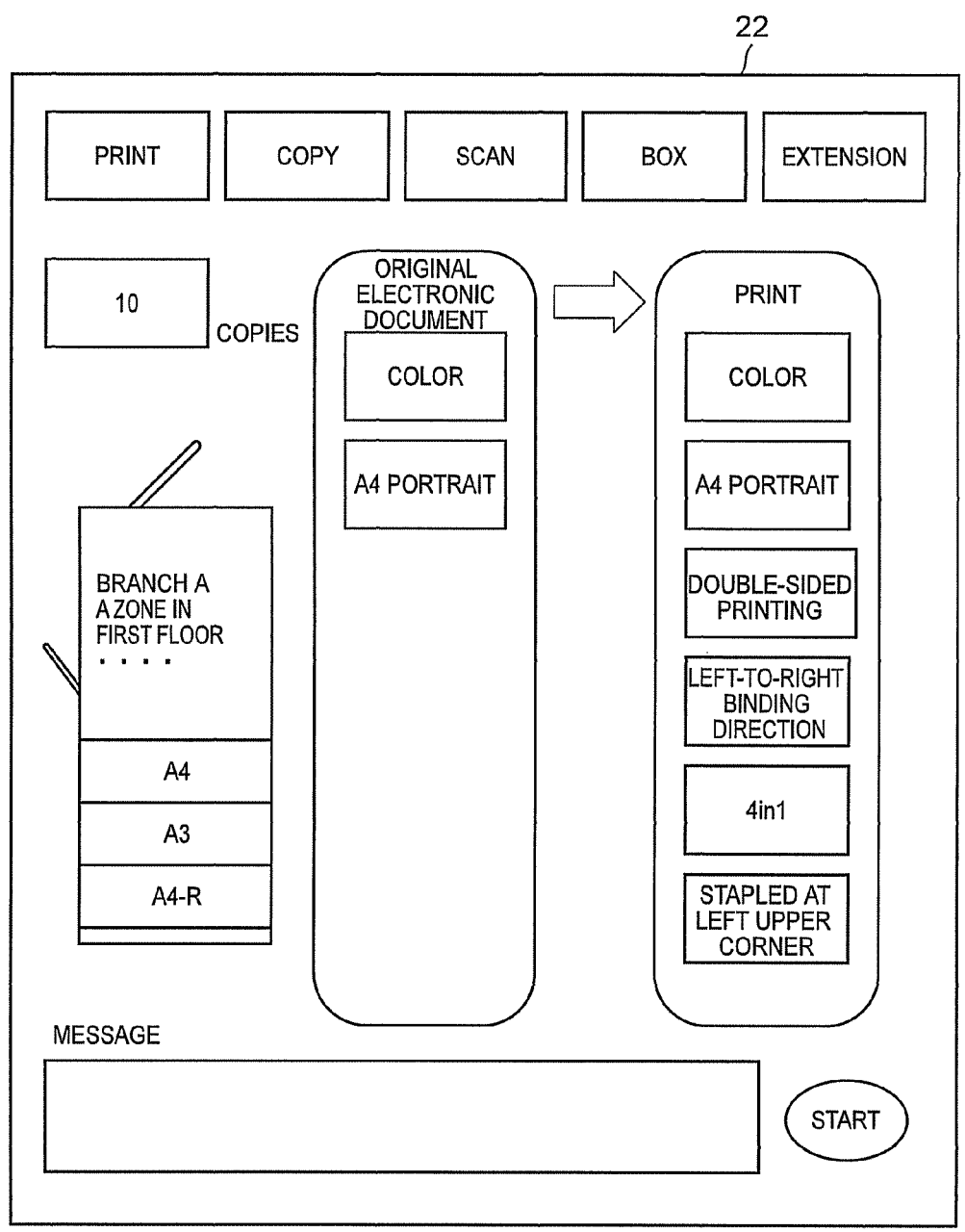
FIG. 12 is a diagram showing a first display example of an operation screen of an operating device in a system according to an embodiment.

FIG. 12 is a diagram showing a first display example of the operation screen 22. The reference numerals described above represent the same elements.

The operation screen 22 includes a plurality of screen buttons representing task content such as printing, copying, scanning, box, and extension. The drawing shows an example when a print button is selected.

The drawing shows attributes of an MFP 10 at a first office, for example. An operation screen selected by searching from the operation environment information is displayed.

In relation to a copying condition, an A4-sized (ISO (international organization for standardization) A4 size) electronic original document should be copied in color.

In relation to a printing condition, double-sided color printing should be performed on A4-sized sheets in a left-to-right binding direction in a four-in-one size (four original document screens on one surface) with the left upper corners stapled. The number of sheets is ten.

In the example in the drawing, printing is assumed to be a task that the user frequently uses. The exemplified screen is assumed to be a familiar screen for the user. The operating device 11 that the user usually uses is a client personal computer on the desk of the user. It is assumed that the printing task is executed from the computer.

The user may register an operation screen of preference for the own operating device 11 in advance in the operation environment management section 3.

Figure 13:
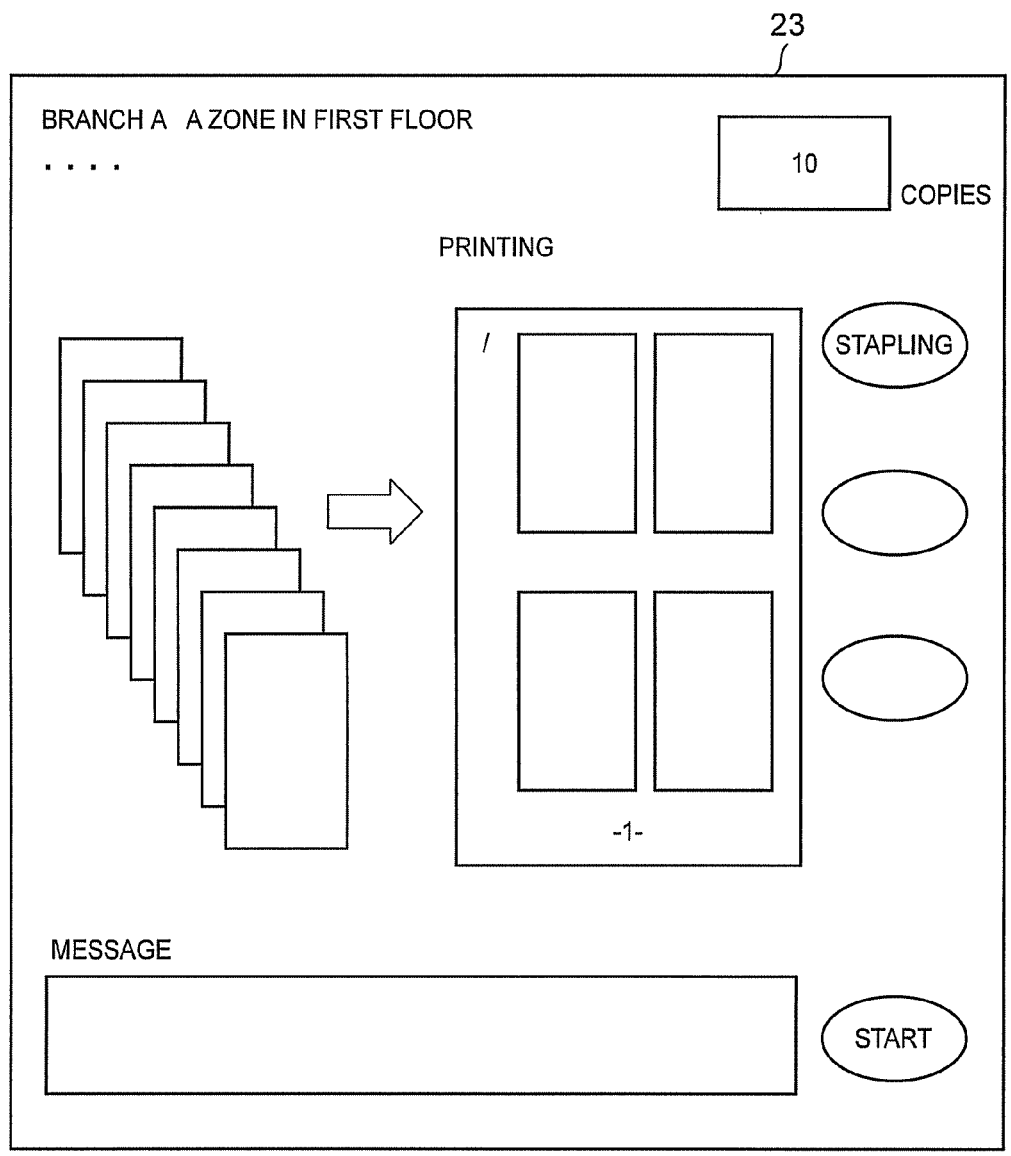
FIG. 13 is a diagram showing a screen display example of another operating device in a system according to an embodiment.

FIG. 13 is a diagram showing a screen display example of another operating device 11. The drawing shows another operation screen of preference of a user. The operating device 11 of the user is a mobile phone or a mobile terminal with a touch panel operation screen 23. The user can set the MFP 10 by the operating device 11 and execute a task during traveling.

In the example of the drawing, the operation screen 23 shows thumbnails on the left sides and shows a print preview image on the right side.

The operating device 11 receives a change in setting as necessary. For example, by performing an operation by touch gesture on an original document part or a preview part, the operating device 11 changes the setting.

The above description was made of the example mainly when a plurality of operating device 11 access the MFP 10.

Hereinafter, description will be given of an example when an operating device 11 of one user accesses a plurality of MFPs 10.

Figure 14:
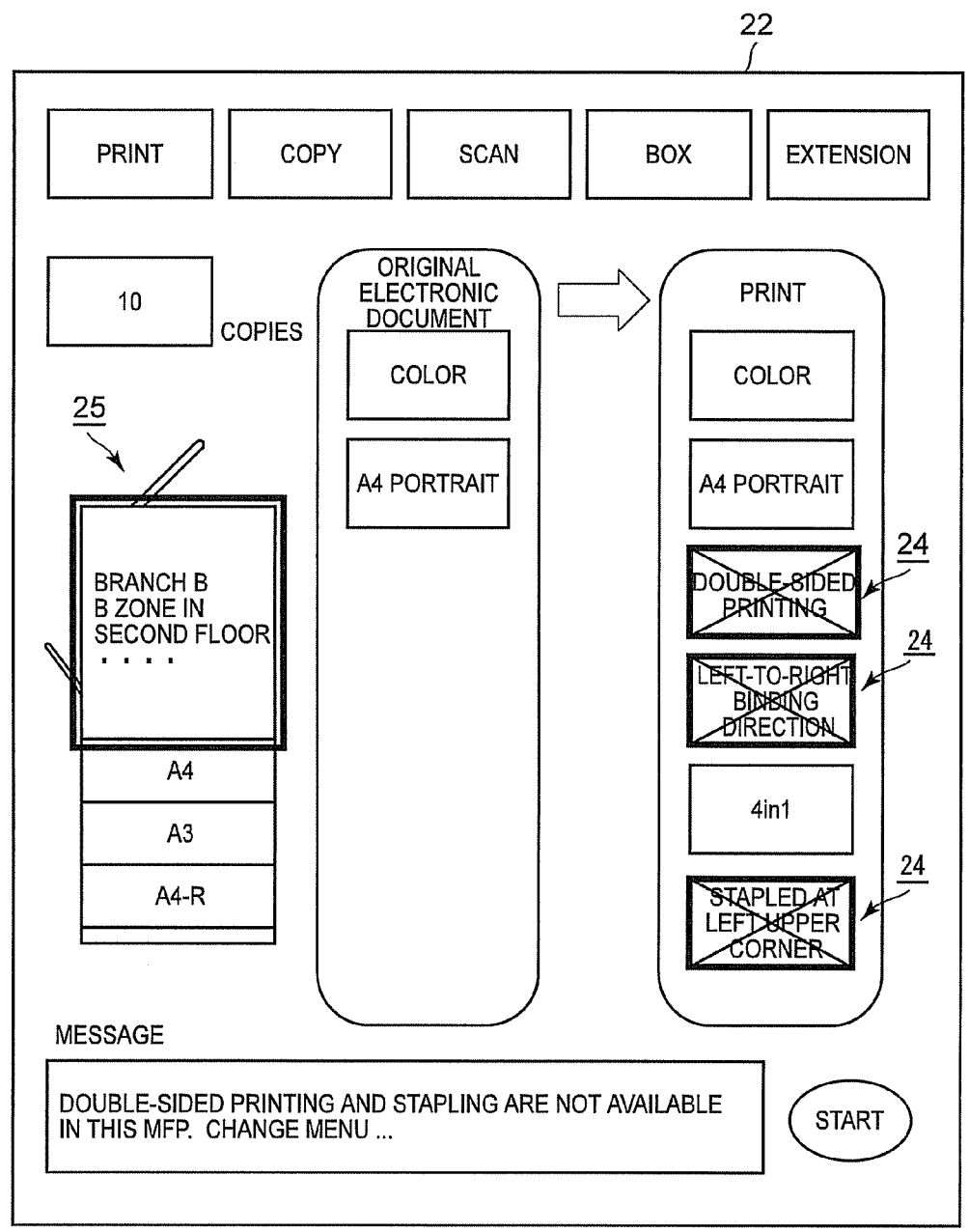
FIG. 14 is a diagram showing a second display example of an operation screen of an operating device in a system according to an embodiment.
Figure 15:
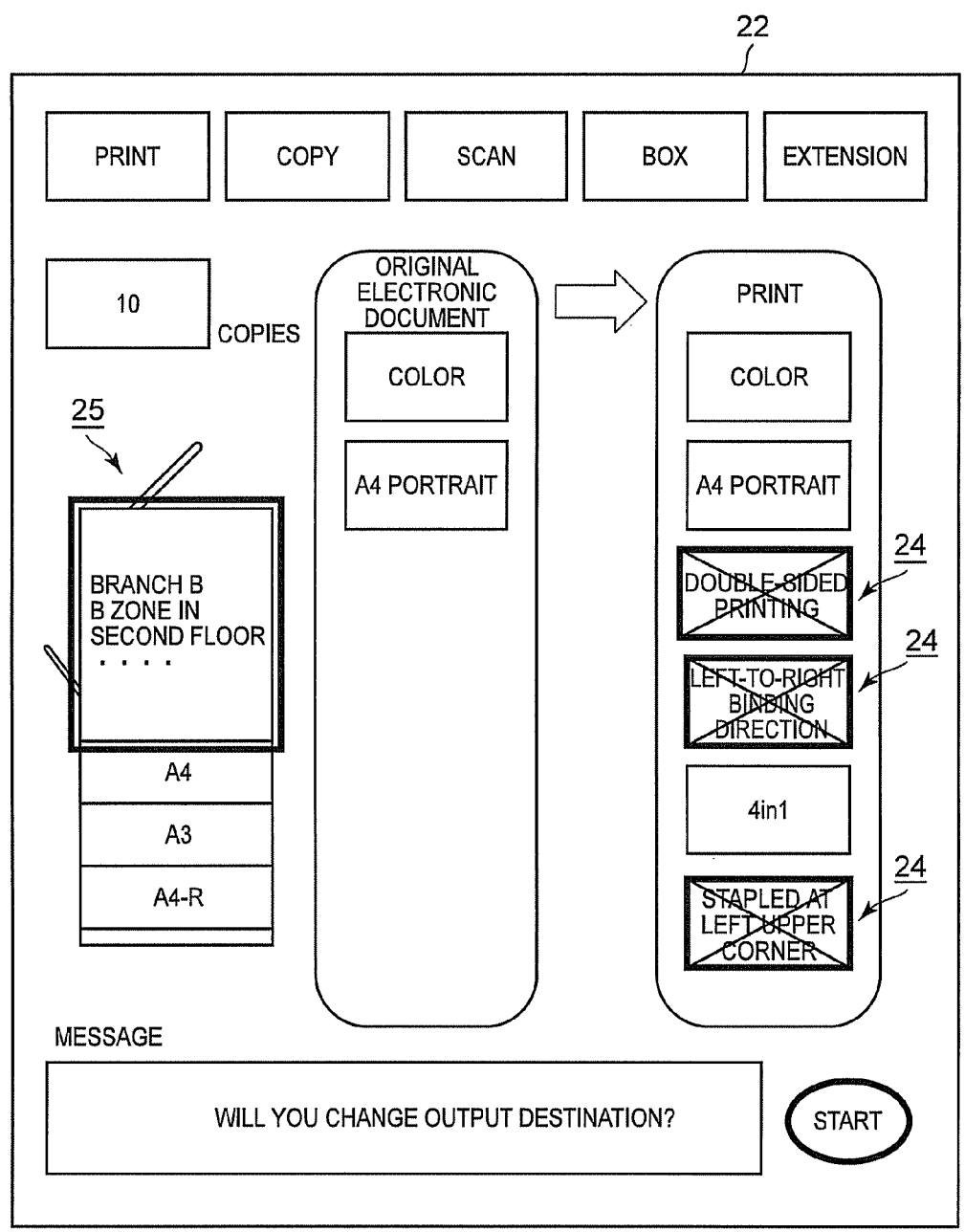
FIG. 15 is a diagram showing a third display example of an operation screen of an operating device in a system according to an embodiment.

FIGS. 14 and 15 are a plurality of diagrams showing the second and third display examples of the operation screen 22. The reference numerals described above represent the same elements.

FIGS. 14 and 15 are diagrams showing a plurality of examples when MFPs 10 at distant locations are requested to execute tasks from an operating device 11. The same setting as that in the example in FIG. 12 is executed on the operation screen 22.

In the example of the drawing, it is assumed that a user performs an operation for causing MFPs 10 at a destination of business travel to execute tasks before the user is out and on the way to the destination.

An MFP 10 that the user designates (hereinafter, also referred to as a designated MFP 10) does not have functions of double-sided printing and stapling. The designated MFP 10 does not have ability for executing the tasks in the original setting that the user desires.

The operating device 11 adds a plurality of displays 24, which represent the functions that cannot be performed, on the operation screen 22. The operating device 11 displays the display 24 on the buttons of the functions which cannot be executed in the designated MFP 10.

The display 24 includes an emphasis frame and an X mark. Coloring may be made for emphasizing the display 24.

On the operation screen 22, the user selects one of the plurality of following options: selecting the designated MFP 10 and allowing functions that can be executed without using the functions that cannot be executed; changing the setting of the function items designated with the display 24; and designating another MFP 10 again.

In order to designate another MFP 10 again, the operating device 11 adds to the operation screen 22 another emphasis display 25 as well as the display 24 representing that the function cannot be executed. The emphasis display 25 is added to a mark representing the designated MFP 10 to encourage, the user to designate the MFP 10 again as one option. The emphasized display 25 may be an emphasis frame, or be given a color for emphasis, for example.

In addition, the operating device 11 may display a message on the operation screen 22. The sentence of the message encourages the user to select the above option.

In FIG. 15, if the operating device 11 detects pressing of the start button, the operating device 11 determines that the start of task execution by the designated MFP 10 is being requested. After the user accepts that some functions cannot be executed, the originally designated MFP 10 is fixed. The detection by the operating device 11 is detection of tapping in the case of a touch panel.

Figure 16:
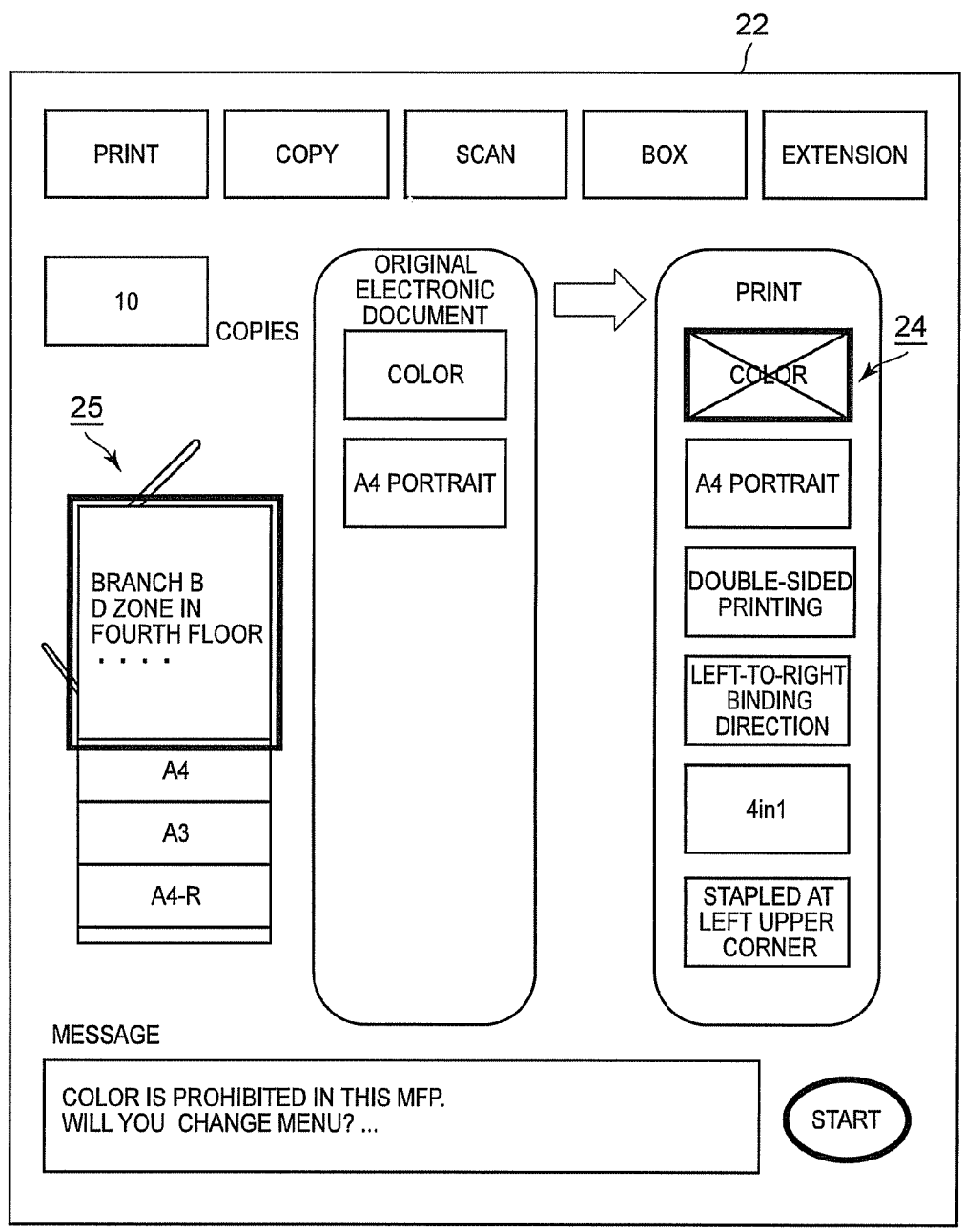
FIG. 16 is a diagram showing a fourth display example of an operation screen of an operating device in a system according to an embodiment.

FIG. 16 is a diagram showing a fourth display example of the operation screen 22. The reference numerals described above represent the same elements. The drawing shows a screen example when the operating device 11 in the examples in FIGS. 14 and 15 designates another MFP 10.

The designated MFP 10 selected by the operation is shown with the emphasized display 25. In the designated MFP 10, setting of prohibiting color printing is made as shown in FIG. 10.

On the operation screen 22, the user selects one of the plurality of following options: causing the designated MFP 10 to execute the task without using color printing; selecting another MFP 10 again; and requesting an administrator of the designated MFP 10 to release the prohibition of using color printing.

Figure 17:
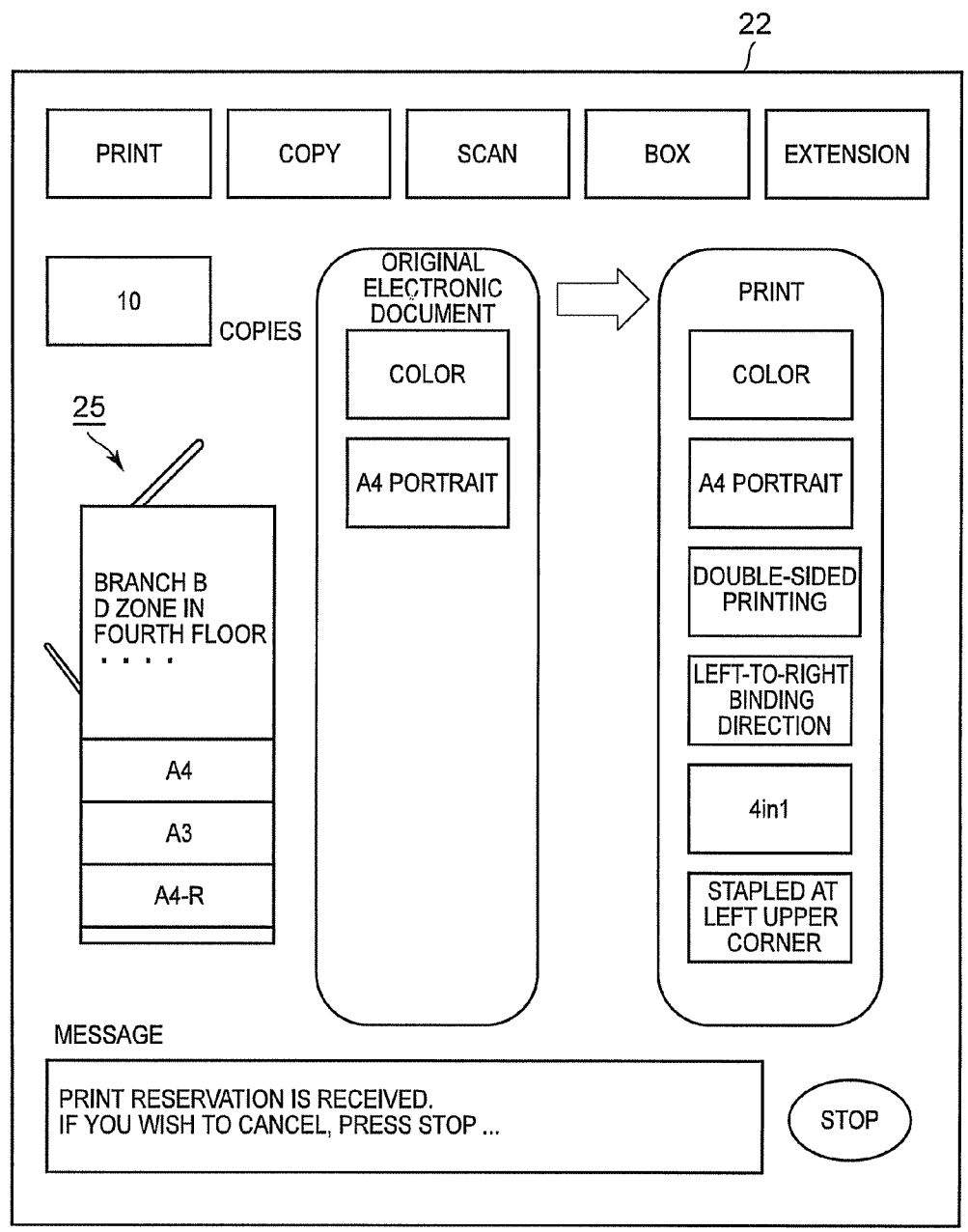
FIG. 17 is a diagram showing a fifth display example of an operation screen of an operating device in a system according to an embodiment.

FIG. 17 is a diagram showing a fifth display example of the operation screen 22. The reference numerals described above represent the same elements. The drawing shows a screen example when the operating device 11 in the example in FIG. 16 accepts the prohibition of color printing and requesting the designated MFP 10 to execute the tasks.

The original setting content is for performing color printing of an A4-sized electronic original document as shown in FIG. 12. The setting content is executing double-sided color printing on A4-sized sheets in a left-to-right binding direction in a four-in-one size with the left upper corners stapled to obtain 10 units of such printing.

The setting content shown in FIG. 17 is obtained by changing from the setting content shown in FIG. 12 the color A4-sized sheet into monochrome A4-sized sheet and making a reservation for the task. The change of the setting is made due to the restriction relating the task of the MFP 10 at the distant location.

As described above, the operating device 11 sets the tasks in the plurality of MFPs 10 via the familiar operation screen 22 for the user or the operation screen 22 of preference. The operating device 11 requires the MFP 10 to execute the task.

The system 1 reflects the functions and the state of the designated task execution device in the task setting and requirement of executing the tasks.

The system 1 allows the user to recognize the original setting content and the changed setting content. The system 1 displays a message for encouraging the user to accept the restriction information, change the setting, or designate another device again after the recognition.

In FIGS. 12 to 17, the system 1 executes the same motion as that in the case of printing even if a task other than printing is selected.

Figure 18:
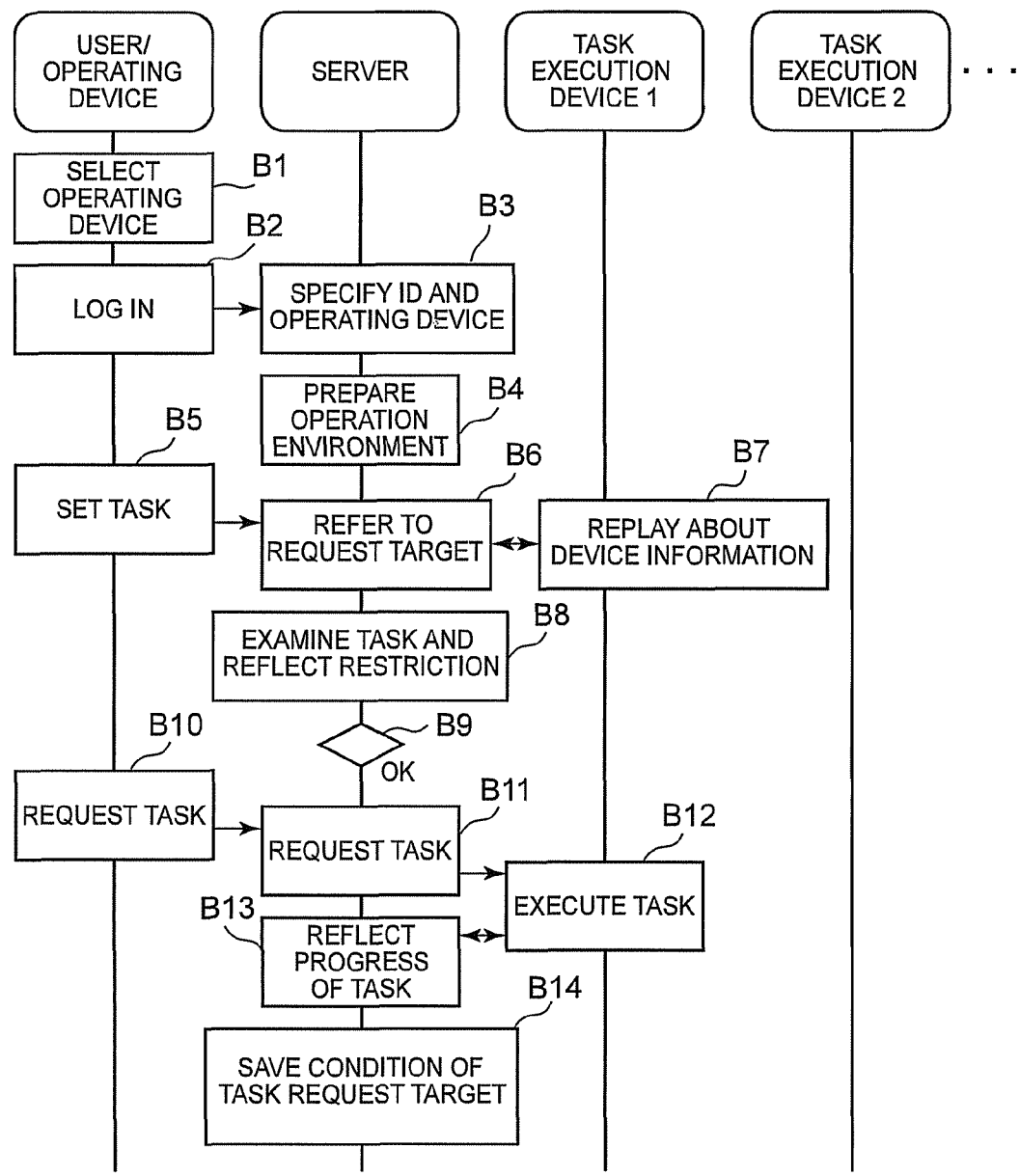
FIG. 18 is a diagram showing a first activity of a system according to an embodiment.

FIG. 18 is a diagram showing a first activity of the system 1.

The drawing shows that the operating device 11 selects one of two MFPs 10 via the server 12 with the operation environment management function. In the drawing, the two MFPs 10 are shown as task execution devices (devices which output print tasks) 1 and 2.

In Act B1, a user selects an operating device 11 to be used. In Act 32, the operating device 11 executes individual authentication by a log-in ID, a password, and the like. If the authentication is successfully made, the operating device 11 logs in the system 1 and receives a service.

In Act B3, the server (operation environment management server) 12 specifies an individual user based on the authenticated user information and the information on the operating device 11.

In Act B4, the server 12 prepares saved existing operation environment information for the user and an operation environment suitable for the operating device 11 being used.

As the operation environment, a configuration of the operation screen, screen object group information, layout information, design of the screen objects, and a method for the screen objects are sent to the operating device 11.

In Act B4, the operating device 11 displays a top menu screen, a screen that is frequently used, or a screen that was previously used after the preparation.

In Act B5, the user sets a print task. As shown in FIG. 12, for example, the user sets an A4-sized color electronic original document from the designated MFP 10. Printing on 10 A4-sized color sheets is set with a condition of double-sided printing, a left-to-right binding direction, a four-in-one size, and stapling at left upper corners.

In Act B6, the server 12 examines the information (functions, a state) of the MFP as a designated output device. In Act B6, the server 12 exchange messages with the MFP 10 (the task execution device 1).

In Act B7, the MFP 10 replies the device information (functions, a state) to the server 12. In Act B8, the server 12 compares the designated task content and the reply.

If the task content and the task content in the replay are different in Act B8, the server 12 informs the operating device 11 of that the functions cannot be executed as shown in FIGS. 14, 15, and 16.

In Act B9, the server 12 waits for a reply from the operating device 11. If all designated items cannot be executed as in the case in the drawing, the operating device 11 does not execute the emphasized display for encouraging the user to change the setting in particular. The operating device 11 reflects the display 24 to the operation screen 22 when informed of that the task cannot be executed.

In Act B10, the operating device 11 sends a task request to the sever 12. In Act B10, the user presses the start button on the menu screen after recognizing that the task content can be executed. The operating device 11 sends an execution request including the task content to the server 12.

In Act B11, the server 12 receives the request and informs the designated MFP 10 of the requirement of executing the task by the designated MFP 10. Alternatively, the operating device 11 may directly designate a certain task execution device and inform the task execution device of the requirement of executing the task.

In Act B12, the MFP 10 finishes the print task.

In Act B13, the server 12 may monitor the progress of executing the task by the task execution device which the server 12 informed of the task execution. The server 12 may execute periodic polling or state notification from the task execution device, for example. The server 12 may send information after the reflection to the operating device 11.

In Act B14, the server saves the information of the operating device 11 used by the user, the task content which the server 12 informed of task execution, and the conditions imposed on the task execution device as history information. After completion of the task execution, the saved information is used for providing the operation environment for the user, another similar operating device 11, and the same task execution device.

Figure 19:
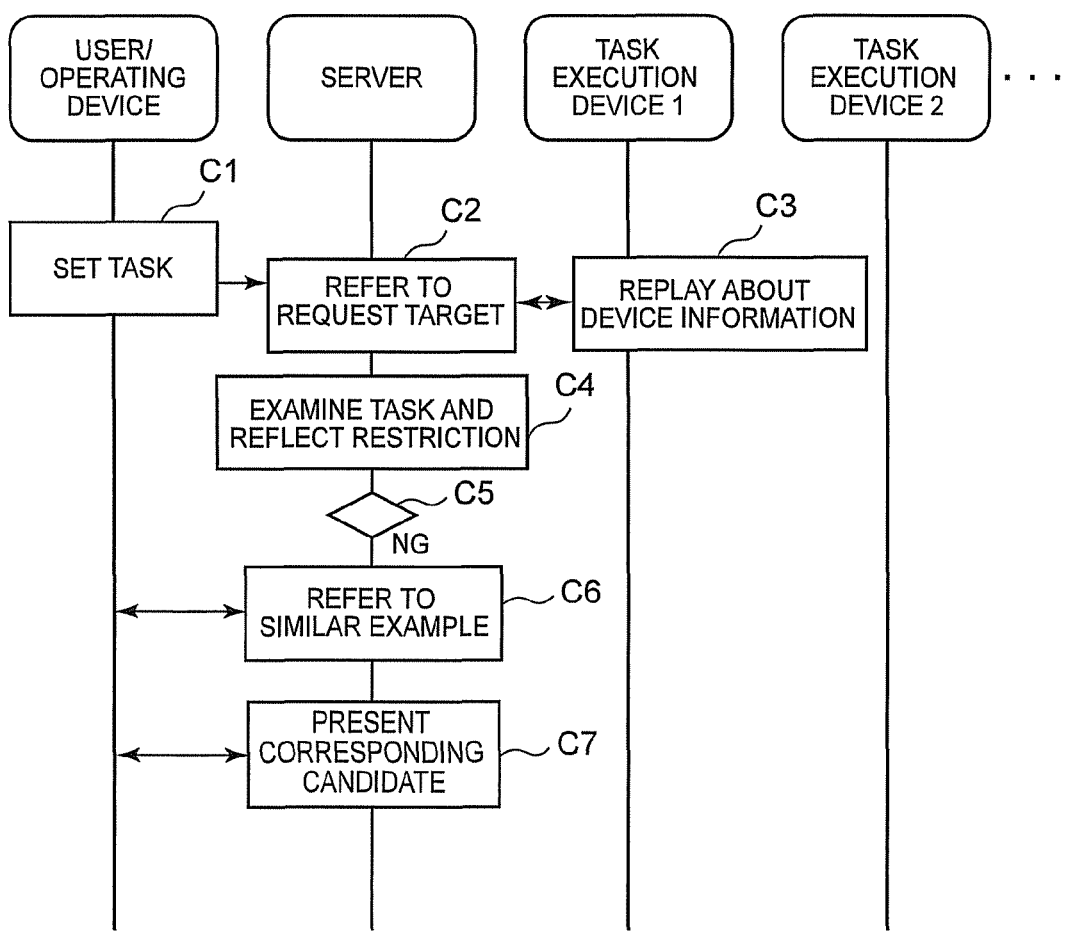
FIG. 19 is a diagram showing a second activity of a system according to an embodiment.

FIG. 19 is a diagram showing a second activity of the system 1. The drawing shows a similar example to the examples in FIGS. 14 and 15. The drawing shows an example when the task content required by the operating device 11 cannot be executed due to the restriction of the designated MFP 10.

The operating device 11 sends a task setting (Act C1).

The server 12 examines information on the designated MFP 10 (Act C2). The server 12 receives a replay from the task execution device (Act C3).

The server 12 determines that a part of the requested task items cannot be executed (Acts C4 and C5).

Via NG route of Act C5, in Act C6, the operating device 11 receives the determination result from the server 12. The operating device 11 displays candidates to be changed on the operation screen 22. For example, the operating device 11 displays setting change items and a message of selecting another MFP 10 again.

In Act C6, the server 12 extracts a task case which is similar to the requested task from saved information on the task execution device. Alternatively, the server 12 extracts a certain task execution device positioned near the position where the designated MFP 10 is placed as a candidate.

In Act C7, when the task execution device designated by the task from the operating device 11 is a task execution device designated again, the server 12 sends information representing that the task execution device is designated again to the operating device 11. The candidate device is presented to the operating device 11 as recommendation information.

Figure 20:
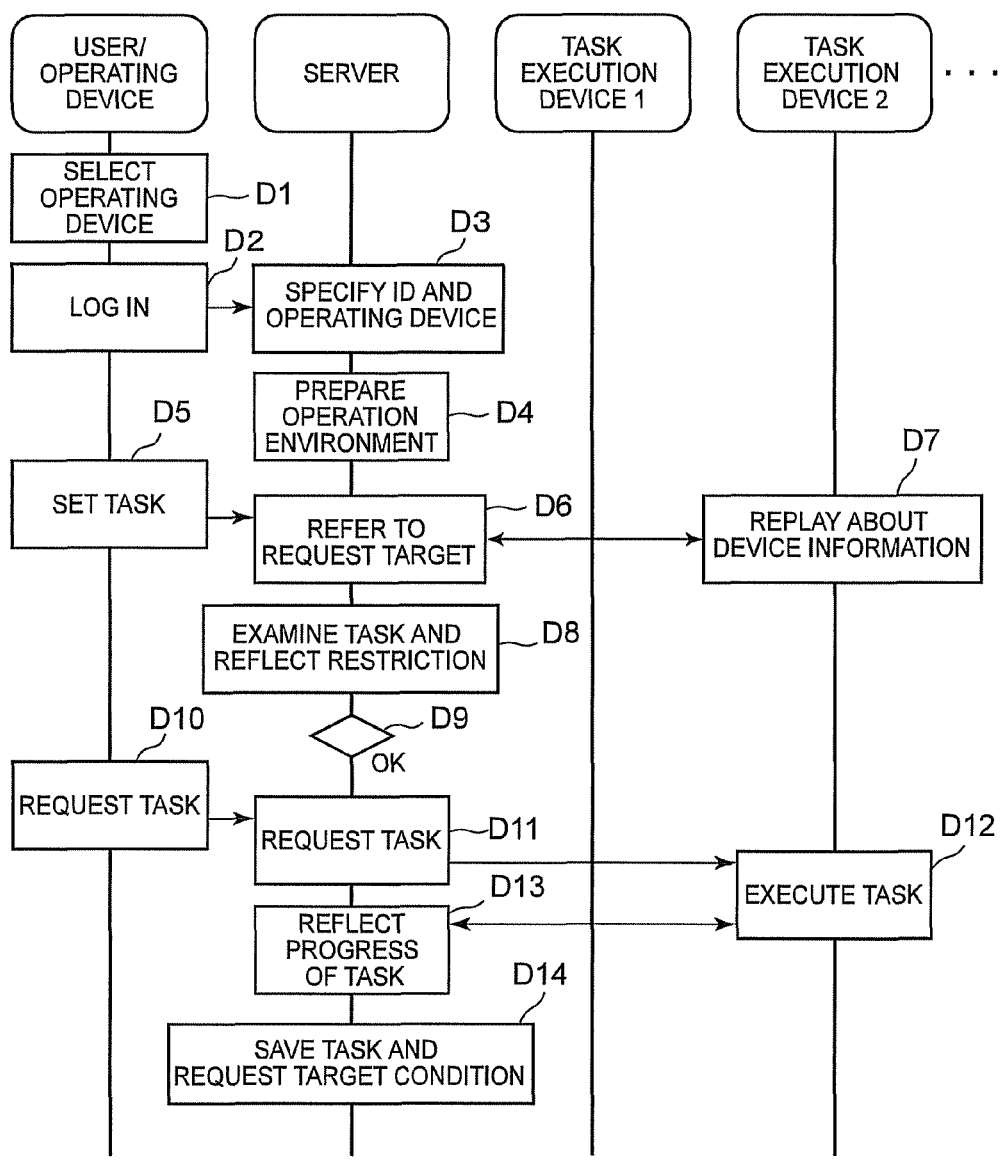
FIG. 20 is a diagram showing a third activity of a system according to an embodiment.

FIG. 20 is a diagram showing a third activity of the system 1. The drawing shows an example when a different task execution device from the task execution device designated in the example in FIG. 18 is designated.

Acts D1 to D14 are substantially the same as Acts B1 to B14.

As shown in FIG. 20, the operating device 11 accepts restriction information of another MFP 10 designated again. The alternate MFP 10 executes the requested task required.

In FIGS. 18 to 20, the server 12 saves information on the operation environments used in the past in the log information storage section 20 in FIG. 3 for each user.

As the log information (history information), the server 12 saves the performed task content, the task content items which were not executed, and the alternate conditions.

The alternate conditions means task content is executed instead of the requested task content or a task execution device is selected instead of the requested task execution device.

The operation history storage section 21 saves the operation history as well as the log information of the user.

In addition, the server 12 may save the log information and the operation history for each of the operating devices 11 and the task execution devices.

According to the system 1, the user can obtain an operation environment where uniform operations are possible in accordance with the operating device 11 selected by the user, the required task, and the designated task execution device based on the information saved in the server 12 as described above.

In the related art, an operation panel is arranged in a standalone task execution device such as a copy machine or an image forming device. The image forming device executes processing in desired setting input by a user on the operation panel.

However, when the user performs a setting operation, other users cannot use the image forming device. Other users should wait. If a user registers frequently used functions from a common menu screen, the user needs to set the selection every time the user uses the functions.

On the other hand, a user causes a computer with a printer driver installed therein to execute printing on a sheet. Each user registers print settings on an individual computer. The setting operation on the individual computer does not make the users wait.

Saving settings for each user on an individual computer of each user makes it possible to omit a piece of work for setting frequently used functions.

In recent years, a user can operate an image forming device in a remote manner via a plurality of operating devices.

However, individual operating devices have different operation screens and different operation methods. An operating device with a preferred setting is limited only to a specific operating device.

In addition, a user causes the image forming devices provided at a plurality of positions to execute tasks.

However, individual image forming devices have different operation screens and different operation methods. A task execution device with preferred operation setting is limited only to a specific device.

According to the server device, the system, and the method of this embodiment, it is possible to select a task execution device again in accordance with the functional restriction of a task execution device selected by a user and other states. Whether or not a task selected by the user can be executed is reflected to the operation screen and the operation method of the operating device 11. The user can change the content of the requested task.

Other Embodiments

Although the operation management function by the operation environment management section 3 is mounted on the server 12 in the above embodiment, the operation environment management section 3 may be mounted on the MFP 10.

The management method reflects a restriction condition to the operation environment information in accordance with an examination result in reflecting the examination result and provides the operation environment information after the reflection to the MFP 10.

In the above embodiment, the functions of the operation environment management section 3 may be mounted on a plurality of server groups in a divided manner.

Although the task execution device is the MFP 10 in the above embodiment, another image forming device, an image input device, an image processing device, or an image saving device may be used instead of the MFP 10.

Although the operation environment means the operation screen in the above embodiment, the operation environment is not limited to the operation screen. The content shown on the operation screen may be shown by motions of hand gestures.

FIGS. 4A to 4C and FIGS. 11A to 11 C were described for illustrative purposes only. Any articles implemented merely by changing a part thereof do not damage superiority of the server device, the system, and the method according to the embodiment.

While certain embodiments have been described, these embodiments have been presented by way of example only, and are not intended to limit the scope of the inventions. Indeed, the novel methods and systems described herein may be embodied in a variety of other forms; furthermore various omissions and substitutions and changes in the form of methods and systems described herein may be made without departing from the spirit of the inventions. The accompanying claims and their equivalents are intended to cover such forms or modifications as would fall within the scope and spirits of the inventions.

What is claimed is:

1. A server device comprising:
a first storage section configured to store task execution device information on correspondence between a task and restriction information for the task for each of identification information items of a plurality of task execution devices, each of the plurality of task execution devices respectively executing tasks including a series of operation elements;
a second storage section configured to store operation environment information including screen display attributes for each identification information item of an operating device, the operating device including a screen and a menu on the screen, selecting one of the plurality of task execution devices by operating the menu, and requesting the task execution device to execute the task;
a receiving section configured to receive identification information on the operating device, identification information on the task execution device, and a requested task to the task execution device from the operating device registered in the second storage section; and
a providing section configured to examine whether or not the requested task is executable based on the requested task sent to the receiving section and the restriction information of the task execution device information corresponding to the identification information of the task execution device and provide an examination result and the operation environment information corresponding to the identification information of the operating device to the operating device.

2. The server device of claim 1,
wherein the providing section obtains a restriction condition imposed on the task execution device based on the restriction information in accordance with the examination result, reflects the restriction condition to the operation environment information, and provides the operation environment information after the reflection to the operating device.

3. The server device of claim 1,
wherein the providing section gives information for encouraging the operating device to select another task execution device again or to change the requested task, according to the examination result representing that the requested task cannot be executed based on the restriction information.

4. The server device of claim 1,
wherein the first storage section stores device attributes including an installation position and a device type for each of the identification information items of the task execution devices, and the receiving section collects position information of the operating device, and
wherein the providing section selects one or more candidates among the plurality of task execution devices based on the device attributes, the position information of the operating device, and content of the requested task and suggests the candidates to the operating device.

5. The server device of claim 1, further comprising:
a log information storage section configured to store log information on correspondence between user attributes and a use history of the task execution devices for each first identification information of a user,
wherein the providing section obtains the use history in the log information corresponding to second identification information of the user, the second identification information of the user being obtained by the receiving section, and reflects the use history to the operation environment information.

6. The server device of claim 2, further comprising:
an operation history storage section configured to accumulate a first history of the operation environment history after the reflection, the operation history storage section storing a second history including the requested task and the identification information of the task execution device,
wherein the providing section presents as a candidate other operation environment information which is the same as or similar to the operation environment information after the reflection saved in the operation history storage section to the operating device.

7. The server device of claim 1,
wherein the second storage section stores the operation environment information customized for each identification information item of the user.

8. The server device of claim 1,
wherein the second storage section stores the operation environment information customized for each identification information item of the operating device.

9. The server device of claim 1,
wherein the providing section provides information representing that the requested task is executed or information representing that the requested task is not executed.

10. A system comprising:
a plurality of task execution devices respectively configured to execute tasks including series of operation elements;
at least one operating device configured to include a screen and a menu on the screen, select one of the plurality of task execution devices by operating the menu, and request the task execution device to execute the task;
a first storage section provided in one or a plurality of server device groups and configured to store task execution device information on correspondence between the task and restriction information for the task for each of identification information items of a plurality of task execution devices;
a second storage section configured to store operation environment information including screen display attributes for each identification information item of an operating device;
a receiving section configured to receive identification information on the operating device, identification information on the task execution device, and a requested task to the task execution device from the operating device registered in the second storage section; and
a providing section configured to examine whether or not the requested task is executable based on the requested task to the receiving section and the restriction information of the task execution device information corresponding to the identification information of the task execution device and provide an examination result and the operation environment information corresponding to the identification information of the operating device to the operating device.

11. The system of claim 10,
wherein the providing section obtains a restriction condition imposed on the task execution device based on the restriction information in accordance with the examination result, reflects the restriction condition to the operation environment information, and provides the operation environment information after the reflection to at least one of the operating device and the task execution device.

12. The system of claim 10,
wherein the providing section gives information for encouraging the operating device to select another task execution device again or change the requested task, according to the examination result representing that the requested task cannot be executed based on the restriction information.

13. The system of claim 10,
wherein the first storage section stores device attributes including an installation position and a device type for each of the identification information items of the task execution devices, and the receiving section collects position information of the operating device, and
wherein the providing section selects one or more candidates among the plurality of task execution devices based on the device attribute, the position information of the operating device, and requested content of the requested task and suggests the candidates to the operating device.

14. The system of claim 10, further comprising:
a log information storage section configured to store log information on correspondence between user attributes and a use history of the task execution devices for each identification information item of a user of the operating device,
wherein the operating device updates screen display content based on the use history in the log information corresponding to the identification information of the user.

15. The system of claim 11, further comprising:
an operation history storage section configured to accumulate a first history of the operation environment information after the reflection, the operation history storage section storing a second history including the requested task and the identification information of the task execution device,
wherein the providing section presents as a candidate other operation environment information which is the same as or similar to the operation environment information after the reflection saved in the operation history storage section to the operating device.

16. The system of claim 10,
wherein the receiving section collects information including remaining amounts of consumables, use states, and reservation states of the task execution devices for each of the plurality of task execution devices, and the providing section reflects the information to the operation environment information.

17. An operation environment management method comprising:
preparing task execution device information on correspondence between a task including a series of operation elements and restriction information for the task for each of identification information items of a plurality of task execution devices and preparing operation environment information to be provided to an operating device, which include screen display attributes, for each identification information item of the operating device which includes a screen and a menu on the screen;
receiving a request including identification information of the operating device, identification information of the task execution device, and a requested task to the task execution device and thereby examining whether or not the requested is executable based on the restriction information corresponding to the identification information of the task execution device and the requested task; and
providing an examination result and the operation environment information corresponding to the identification information of the operating device to the operating device.

18. The management method of claim 17,
wherein in reflecting the examination result, a restriction condition imposed on the task execution device based on the restriction information is obtained in accordance with the examination results, the restriction condition is reflected to the operation environment information, and the operation environment information after the reflection is provided to at least one of the operating device and the task execution device.

19. The management method of claim 17,
wherein in reflecting the examination result,
position information of the operating device is obtained; and one or more candidates among the plurality of task execution devices obtained by searching based on the position information and device attribute including an installation position and a device type included in the task execution device information are included in display content.

20. The management method of claim 17, further comprising:

accumulating user operation histories via the operating device or the task execution device; and reflecting the operation histories to the operation environment information.

\* \* \* \* \*